(12) United States Patent
Balachandran et al.

(10) Patent No.: US 11,788,877 B2
(45) Date of Patent: *Oct. 17, 2023

(54) APPARATUS AND METHOD FOR WASTE MONITORING AND ANALYSIS

(71) Applicant: Zabble, Inc., Walnut Creek, CA (US)

(72) Inventors: Nikhil Balachandran, Walnut Creek, CA (US); Orlando Talavera, Concord, CA (US)

(73) Assignee: Zabble, Inc., Walnut Creek, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 17/170,866

(22) Filed: Feb. 8, 2021

(65) Prior Publication Data

US 2021/0217156 A1 Jul. 15, 2021

Related U.S. Application Data

(63) Continuation-in-part of application No. 16/400,727, filed on May 1, 2019, now Pat. No. 10,955,284.

(Continued)

(51) Int. Cl.
*G01G 17/00* (2006.01)
*G06T 7/00* (2017.01)
(Continued)

(52) U.S. Cl.
CPC ............... *G01G 17/00* (2013.01); *G06N 3/08* (2013.01); *G06N 20/10* (2019.01); *G06T 7/001* (2013.01);
(Continued)

(58) Field of Classification Search
CPC .... G01G 17/00; G01G 19/52; G01G 23/3735; G01G 19/415; G06N 3/08; G06N 20/10;
(Continued)

(56) References Cited

U.S. PATENT DOCUMENTS 6,356,205 B1 3/2002 Salvo et al.
6,864,436 B1 3/2005 Nobes et al.
(Continued)

FOREIGN PATENT DOCUMENTS

WO 2015162417 A1 10/2015

OTHER PUBLICATIONS

Morissey et al., "Waste Management Models And Their Application To Sustainable Waste Management," Waste Management, vol. 24, Issue 3, 2004, pp. 297-308.

(Continued)

*Primary Examiner* — Jacques M Saint Surin
(74) *Attorney, Agent, or Firm* — Kilpatrick Townsend & Stockton LLP

(57) ABSTRACT

Provided herein are devices, systems, and methods for measuring waste material weight within two or more waste collection bins The bins can be measured using one or more waste measurement devices, and the measurements can be collected and transmitted to networked data storage. Waste measurement data can be collected over time from multiple bin locations, and the stored data can be analyzed and processed to generate reports and ratings of waste collection, disposal, and diversion trends over time. Also provided are waste audit methods and platforms that simplify and streamline data measurement, recording, and analyzing. The audit methods can transfer data electronically to a computer or cloud platform, automatically plot and compare results, and generate reports to be shared with a user or client.

19 Claims, 28 Drawing Sheets

Related U.S. Application Data

(60) Provisional application No. 62/665,368, filed on May 1, 2018.

(51) Int. Cl.
  *G06N 3/08* (2023.01)
  *G06N 20/10* (2019.01)
  *G06V 20/00* (2022.01)
  *G01G 19/415* (2006.01)

(52) U.S. Cl.
  CPC ............ *G06T 7/0008* (2013.01); *G06V 20/00* (2022.01); *G01G 19/415* (2013.01); *G06T 2207/30108* (2013.01)

(58) Field of Classification Search
  CPC ....... G06N 3/045; G06T 7/0008; G06T 7/001; G06T 2207/30108; G06V 20/00; G06Q 10/30; G06Q 30/201; Y02W 90/00; Y02P 90/84
  USPC .......................................................... 177/1
  See application file for complete search history.

(56) References Cited

U.S. PATENT DOCUMENTS

| | | |
|---|---|---|
| 7,124,680 B2 | 10/2006 | Poss et al. |
| 7,328,842 B2 | 2/2008 | Wagner et al. |
| 7,415,375 B2 | 8/2008 | Shakman et al. |
| 7,511,234 B1 | 3/2009 | Ebinger |
| 8,475,367 B1 | 7/2013 | Yuen et al. |
| 8,636,516 B2 | 1/2014 | Batsikouras |
| 8,696,569 B2 | 4/2014 | Yuen et al. |
| 8,747,312 B2 | 6/2014 | Yuen et al. |
| 8,868,434 B2 * | 10/2014 | Mallett ................. B07C 5/34 705/1.1 |
| 9,084,536 B2 | 7/2015 | Yuen et al. |
| 9,084,537 B2 | 7/2015 | Yuen et al. |
| 9,084,538 B2 | 7/2015 | Yuen et al. |
| 9,173,576 B2 | 11/2015 | Yuen et al. |
| 9,173,577 B2 | 11/2015 | Yuen et al. |
| 9,202,111 B2 | 12/2015 | Arnold et al. |
| 9,247,884 B2 | 2/2016 | Yuen et al. |
| 9,347,821 B1 | 5/2016 | Mullaney |
| 9,433,357 B2 | 9/2016 | Yuen et al. |
| 9,574,892 B2 | 2/2017 | Rodoni |
| 9,721,342 B2 * | 8/2017 | Mask ................. G06V 20/64 |
| 10,955,284 B2 | 3/2021 | Balachandran et al. |
| 2004/0226755 A1 | 11/2004 | Pottebaum et al. |
| 2010/0179912 A1 | 7/2010 | Curotto |
| 2014/0278630 A1 | 9/2014 | Gates et al. |
| 2015/0144012 A1 | 5/2015 | Frybarger |
| 2015/0307273 A1 | 10/2015 | Lyman |
| 2016/0176630 A1 | 6/2016 | Shahabdeen |
| 2019/0197498 A1 * | 6/2019 | Gates ................. H04N 7/181 |
| 2020/0013024 A1 * | 1/2020 | Armstrong ............ G06T 7/62 |
| 2020/0108428 A1 | 4/2020 | Cummings et al. |
| 2020/0222949 A1 | 7/2020 | Murad et al. |
| 2021/0197498 A1 * | 7/2021 | Sahin ............... B29C 70/025 |

OTHER PUBLICATIONS

Ibrahim et al., "ContamiNet: Detecting Contamination in Municipal Solid Waste," arXiV:1911.04583vI, [cs.CV] Nov. 11, 2019, 8 pages.
Wang et al., "Convolutional Neural Network for Image Classification," 7 pages, Downloaded from http://www.cs.jhu.edu/~cwang107/files/cnn.pdf.
U.S. Appl. No. 16/400,727, Notice of Allowance, dated Nov. 25, 2020, 9 pages.

* cited by examiner

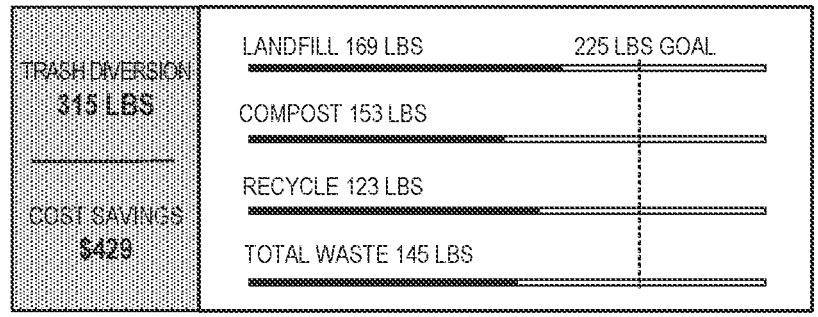
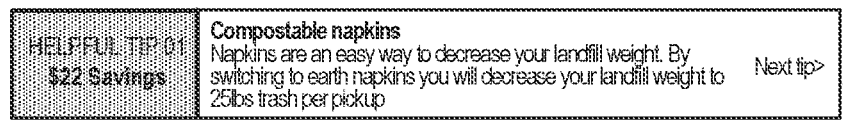
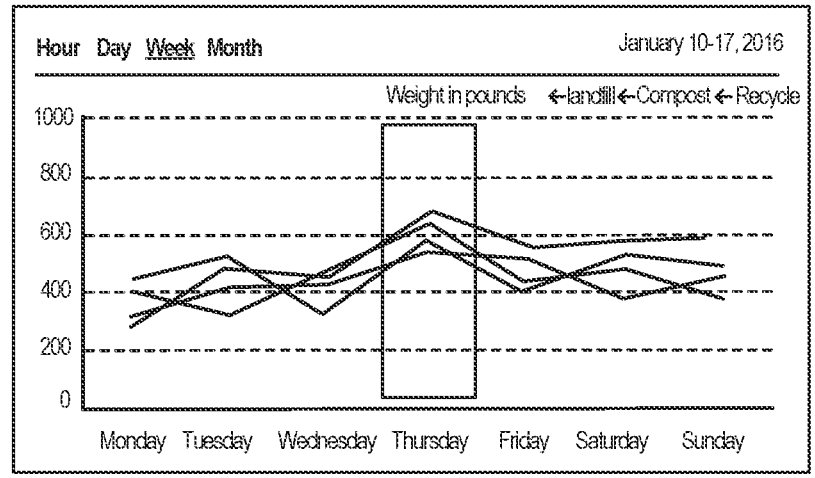
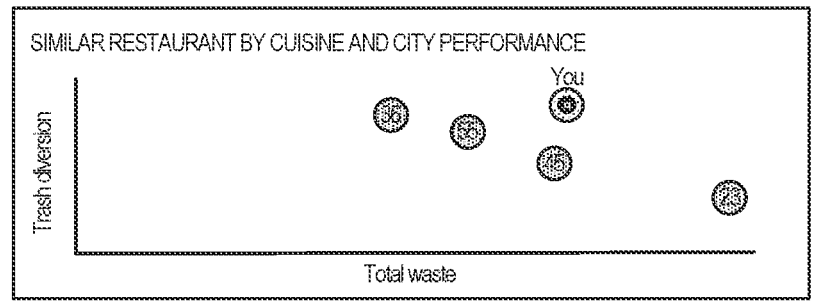
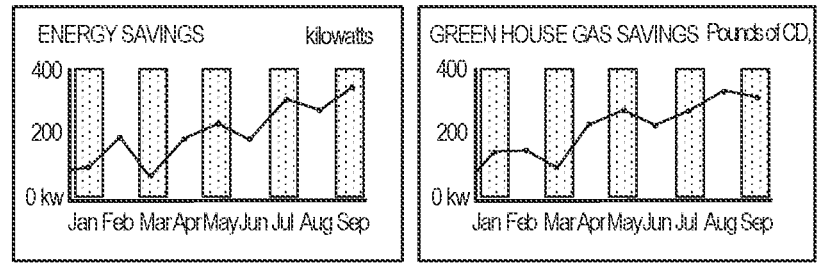
FIG. 5

FIG. 8

Overall Waste Summary (Tons)

| | |
|---|---|
| Total Waste Generated | 2.0 |
| Total Waste Recycled | 1.4 |
| Total Waste Composted | 0.3 |
| Total Waste Landfilled | 0.3 |

Occupant Summary (lbs)

| | |
|---|---|
| Waste Generated Per Occupant | 10 |
| Waste Diverted Per Occupant | 8.5 |

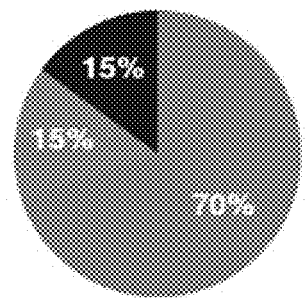

● Total Waste Recycled
● Total Waste Composted
● Total Waste Landfilled

Materials Summary (Tons)

| MATERIALS | LANDFILL | RECYCLE | COMPOST |
|---|---|---|---|
| Recyclables (Paper, Plastic, Metals, Glass) | 0.10 | 1.1 | 0.0 |
| Compostables | 0.10 | 0.0 | 0.3 |
| Cardboard | 0.05 | 0.1 | 0.0 |
| Wet Waste | 0.01 | 0.0 | 0.0 |
| Other Recyclables (E-Waste) | 0.05 | 0.1 | 0.0 |
| Other Recyclables (Shredded Paper) | 0.05 | 0.1 | 0.0 |
| Misc | 0.05 | 0.0 | 0.0 |

APPARATUS AND METHOD FOR WASTE MONITORING AND ANALYSIS

CROSS-REFERENCES TO RELATED APPLICATIONS

This application is a continuation-in-part of U.S. patent application Ser. No. 16/400,727, filed May 1, 2019, now allowed, which claims priority to U.S. Provisional Application No. 62/665,368, filed May 1, 2018, each of which is herein incorporated by reference.

BACKGROUND

The reduction of waste material is an increasingly important goal for communities, businesses, and individuals. The development of informed strategies for waste reduction can rely on accurate and detailed information about the sources and amounts of waste material in various stages between waste generation and waste disposal. However, such information is often not readily available.

In general, there is much that is unknown about how much waste is generated by individuals and businesses, and what type of material is included in these waste streams either taken separately or as a whole. Some states, such as California via programs including CalRecycle, have conducted periodic large scale waste characterization studies across residential and commercial groups. Details and results related to the California studies can be publicly accessed online at the CalRecycle web site Furthermore, according to a comprehensive World Bank report, the amount of waste being generated worldwide can be expected to double by 2025 to 6 million tonnes per day. Higher income levels and urbanization are among the factors contributing to an increase in waste per capita because of improved access to consumer products in cities. In the United States alone, per capita waste generation is currently at or near an amount of 4.4 pounds per day, representing approximately one quarter of the world's waste. Despite the magnitude of this waste generation level, only 34% of U.S. waste is currently being recycled or composted. In addition, China's 2018 import ban on accepting recyclable material has already affected existing recycling programs across the United States. Some U.S. counties have begun to stockpile recyclable material to send them to a landfill, and may take the additional step of shutting down curbside recycling programs.

In spite of these challenges, several cities have proposed plans to achieve zero waste. Most cities with zero waste initiatives provide incentives to restaurants and businesses via waste collection companies. These incentives appear in the form of a trash diversion % on the monthly fees charged by waste collection companies for their services. However, this trash diversion % is typically based on the volume of the waste collection bins. Since most trash is instead measured in downstream facilities by weight, a more accurate reflection of trash diversion can be based on weight measurements. However, logistic and operational difficulties can preclude restaurants and businesses from installing scales providing this capability. So, estimated volume is used in some situations as a substitute when weight information is not readily available.

An example of a scale for measuring food waste can be found in U.S. Patent Application No. 2017/0069222, which describes a system that includes a weight mechanism configured for weighing a waste receptacle, wherein the waste receptacle is configured for receiving food waste from a plurality of consecutive disposal events before emptying, a processor configured for measuring the difference in weight of the waste receptacle between each disposal event and calculating the weight of a disposal event based upon the difference and a user interface configured to receive at least one indication categorizing the food waste in a disposal event by a user. A method for monitoring food waste is also described.

The waste material removal scheduling method of in U.S. Patent Application No. 2014/0278630 includes receiving waste material information for each of a set of containers, each container comprising a sensor and configured to contain waste material, the waste material information based on a sensor measurement by the sensor; identifying contents of the waste material contained within each of the set of containers based on the respective waste material information; and determining a collection schedule for the set of containers based on the contents of the waste material for each of the set of containers.

U.S. Pat. No. 7,415,375 discloses a food waste monitoring system that may include a local food waste monitoring device that is coupled to an electronic scale for weighing food waste. The monitoring device may capture and record the weight of food waste as well related information, such as the type of food wasted, the reason for the food becoming waste, the user weighing the food waste, and the type of container the food waste is weighed in. The system may also include a host device in communication with the local monitoring device that provides remote configuration and control of the local monitoring device.

Even in view of these references, the need exists for improved measurement devices and systems capable of identifying and reporting trends in disposing waste.

BRIEF SUMMARY

For some waste reduction applications, it is desirable that the weight of waste material is accurately and repeatedly measured. One technique for weighing waste material is to use a combination of a waste collection bin and a scale to record waste weight. For example, a waste bin can be periodically weighed in a manual or automatic fashion. However, the information supplied by such processes can be limited. For example, the usefulness of waste weight data in isolation may not provide much insight into developing strategies for waste reduction. Rather, the combinations of waste weight measurements from various waste types, locations and/or times can better enable trends to be identified and useful comparisons to be made.

In general, provided herein are devices, systems, and methods for measuring waste material weight within two or more waste collection bins as illustrated in FIG. 1. As shown in the figure, the bins can be measured using one or more waste measurement devices, and the measurements can be collected and transmitted to networked data storage. Waste measurement data can be collected over time from multiple bin locations, and the stored data can be analyzed and processed to generate reports and ratings of waste collection, disposal, and diversion.

One provided waste measurement device includes a platform having an upper surface and a lower surface. The device further includes an array of two of more load cells, wherein each load cell has a top and a bottom. Each load cell top is in mechanical connection with the lower surface of the platform. The array of load cells defines two or more measurement areas on the upper surface of the platform. The device further includes two or more bins, wherein each bin has a floor and one or more bin walls. The bin walls of each of the two or more bins are connected to the floor of the bin, wherein the floor and bin walls of each of the two or more bins define a chamber configured to receive waste material. Each of two or more bins is configured to be removably positioned on one of the measurement areas of the upper surface of the platform. The load cells are configured to generate electrical signals having magnitudes proportional to weights of waste material within the chambers of the two or more bins. The device further includes an amplifier configured to amplify the electrical signals into a digital signal. The device further includes a processor configured to convert the amplified electrical signals into a digital signal. The device further includes a communicator configured to wirelessly transmit the digital signal.

In some embodiments, the waste measurement device further includes a bearing in mechanical connection with the lower surface of the platform and the base, wherein the bearing is configured to allow the platform to rotate relative to the base. In some embodiments, the device further includes a ramp connected to the platform. In some embodiments, the platform of the device is adjustably extendable in at least one dimension. In some embodiments, the device further includes four or more straps mechanically connected to the platform and configured to releasably secure the bins to the platform when the bins are positioned on the measurement areas of the platform. In some embodiments, the device further includes one or more shock absorbers mechanically connected to the platform and the base.

In some embodiments, the one or more load cells of the device are beam type load cells. In some embodiments, the one or more load cells of the device are compression type load cells. In some embodiments, each of the one or more load cells of the device includes a Wheatstone bridge. In some embodiments, the digital signal of the device has an accuracy of $2^{24}$ bits. In some embodiments, the amplifier, processor, and communicator of the device are each integrated into the platform, the base, or one or both of the two or more bins. In some embodiments, the amplifier, processor, and communicator of the device are each within an external enclosure. In some embodiments, the upper surface of the platform of the device comprises a pattern of raised features. In some embodiments, the waste material includes food waste.

Also provided are systems for measuring waste. One provided waste measurement system includes two or more waste measurement devices. Each one of the two or more waste measurement devices includes a platform having an upper surface and a lower surface, and one or more load cells. Each load cell has a top and a bottom, and each load cell top is in mechanical connection with the lower surface of the platform. Each waste measurement device of the system further includes a base connected to each load cell bottom. Each waste measurement device of the system further includes an amplifier configured to amplify the electrical signals generated by the one or more load cells, a processor configured to convert the amplified electrical signals into a digital signal, and a communicator configured to transmit the digital signal. The waste measurement system further includes a controller configured to receive the digital signals transmitted from the two or more waste measurement devices, and to wirelessly broadcast data based on the received digital signals.

In some embodiments, the waste measurement system further includes two or more bins, wherein each bin has a floor and one or more bin walls, wherein the bin walls of each one of the two or more bins are connected to the floor of the bin, wherein the floor and bin walls of each one of the two or more bins define a chamber configured to receive waste material, wherein each of the two or more bins is configured to be removably positioned on the upper surface of the platform of one of the waste measurement devices, and wherein the load cells of each one of the two or more waste measurement devices are configured to generate electrical signals having magnitudes proportional to weights of waste material within the chamber positioned on the upper surface of the platform of the waste measurement device.

In some embodiments, each of the waste measurement devices of the system further includes two or more straps mechanically connected to the platform and configured to releasably secure the bin to the platform when the bin is positioned on the measurement area of the platform. In some embodiments, each of the waste measurement devices of the system further includes a bearing in mechanical connection with the lower surface of the platform and the base, wherein the bearing is configured to allow the platform to rotate relative to the base. In some embodiments, each of the waste measurement devices of the system further includes a ramp connected to the platform. In some embodiments, the platform of each of the waste measurement devices of the system is adjustably extendable in at least one dimension. In some embodiments, the system further includes one or more shock absorbers mechanically connected to the platform and the base.

In some embodiments, the one or more load cells of the system are beam type load cells. In some embodiments, the one or more load cells of the system are compression type load cells. In some embodiments, each of the one or more load cells of the system includes a Wheatstone bridge. In some embodiments, the digital signals of the system each have an accuracy of $2^{24}$ bits. In some embodiments, the amplifier, processor, and communicator of each of the waste measurement devices of the system are each integrated into the platform or the base. In some embodiments, the amplifier, processor, and communicator of each of the waste measurement devices of the system are each within an external enclosure. In some embodiments, the platform of each of the waste measurement devices of the system comprises steel or stainless steel. In some embodiments, the upper surface of the platform of each of the waste measurement devices of the system comprises a pattern of raised features. In some embodiments, the waste material comprises food waste.

Also provided are modules for networking a weight measurement device. One provided module includes a connector configured to couple with a communication port of the weight measurement device. The module further includes a receiver configured to receive a digital signal output by the weight measurement device through the communication port. The module further includes a transmitter configured to wirelessly broadcast data based on the received digital signal. In some embodiments, the connector is a serial connector.

Also provided are methods for monitoring waste. One provided method includes collecting with a computer system, data broadcast by a controller configured to receive digital signals transmitted from a provided waste measurement device or system. The method further includes storing the data in a memory, and analyzing the data with the computer system. The analyzing includes monitoring the weights of waste material within each chamber over time. In some embodiments, the analyzing of the data further includes calculating a decrease in weight of waste material within each chamber over time, comparing the decrease in weight over time for one of the chambers to a target value, and designating a tare weight value for the one chamber when the decrease in weight over time for the one chamber equals or exceeds the target value. In some embodiments, the data further includes identifiers of one or more tagged waste disposers when the one or more tagged waste disposers are in proximity to each chamber. In some embodiments, the analyzing of the data further includes calculating an increase in weight of waste material within each chamber over time, comparing the increase in weight over time for one of the chambers to a threshold value, and recording the identifier of the waste disposer in proximity to the one chamber when the increase in weight over time for the one chamber equals or exceeds the threshold value.

Also provided are methods for measuring waste. The methods comprise providing a waste measuring system comprising a sensing unit, a data collection unit, a display unit, and a data storage unit. The methods further comprise providing a waste container, wherein the waste container is at least partially filled with a waste material, and wherein the waste material comprises a waste type. The methods further comprise communicating to the waste measuring system a waste category corresponding to the waste type, thereby generating waste category data associated with the waste material. The methods further comprise quantifying the weight of the waste container, in response to the communicating, and using the sensing unit, thereby generating waste weight data associated with the waste material. The methods further comprise transmitting the waste category data and the waste weight data to the data collection unit using the sensing unit. The methods further comprise presenting the waste category data and the waste weight data using the display unit.

In some embodiments, the sensing unit comprises a scale. In some embodiments, the sensing unit comprises a provided waste measurement device as described above. In some embodiments, the communicating of the waste category comprises entering a command using the sensing unit. In some embodiments, the communicating of the waste category comprises entering a command using the data collection unit. In certain aspects, the entering of the command comprises touching a button or switch, or speaking a voice prompt. In some embodiments, the data collection unit is a computer system. In certain aspects, the computer system is a mobile device. In some embodiments, the display unit is the sensing unit. In some embodiments, the display unit is the data collection unit.

In some embodiments, the waste container is a first waste container, the waste material is a first waste material, the waste type is a first waste type, the waste category is a first waste category, and the method further comprises providing a second waste container, wherein the second waste container is at least partially filled with a second waste material, and wherein the second waste material comprises a second waste type. The methods can further comprise inputting to the waste measuring system a second waste category corresponding to the second waste type, thereby generating waste category data associated with the second waste material. The methods can further comprise quantifying the weight of the second waste container, in response to the inputting, and using the sensing unit, thereby generating waste weight data associated with the second waste material. The methods can further comprise transmitting the waste category data and the waste weight data to the data collection unit using the sensing unit. The methods can further comprise producing a report comprising waste category data and waste weight data associated with the first waste material and the second waste material.

Also provided are methods for categorizing a waste generator. The methods comprise acquiring a plurality of images of waste containers associated with the waste generator, wherein the images are acquired at two or more times during a selected time period. The methods further comprise estimating, based on the plurality of images, a total volume of waste generated by waste generator during the selected time period. The methods further comprise identifying, based on the plurality of images, common waste material types in the total volume of waste generated during the selected time period. The methods further comprise deriving, using a statistical model, a waste generator score for the waste generator during the selected time period based on the estimated total volume of waste generated and the identified common waste material types. The methods further comprise assigning the waste generator to a category based on the derived waste generator score.

Also provided are methods for evaluating waste. The methods comprise acquiring a plurality of images, wherein each of the plurality of images is independently a representation of at least a portion of the contents of a waste container associated with a waste generator, and wherein the plurality of images comprises representations of at least a portion of the contents of two or more different waste containers. The methods further comprise identifying, for each of at least a portion of the plurality of images, one or more characteristics of the waste container contents represented by the image. The methods further comprise generating, using one or more automated computer systems, a report based on at least a portion of the one or more identified characteristics.

In some embodiments, the plurality of images comprises images acquired at times at least 12 hours apart from one another. In some embodiments, the images acquired at times at least 12 hours apart from one another comprise images representing at least a portion of the contents of the same waste container. In some embodiments, each of the plurality of images is acquired at a time within a 1 hour-period. In some embodiments, the one or more characteristics comprise one or more characteristics selected from the group consisting of an estimated waste container fullness, a categorization of one or more waste material types present in the waste container contents, and a presence or absence of a contaminant in the waste container contents. In some embodiments, the identifying comprises analyzing the portion of the plurality of images using the one or more automated computer systems. In some embodiments, the analyzing comprises applying artificial intelligence and computer vision using the one or more automated computer systems. In some embodiments, the identifying comprises accepting and recording user input descriptive of the portion of the plurality of images.

In some embodiments, the generating of the report comprises deriving estimated aggregated properties for the waste containers of the waste generator. In some embodiments, the report comprises characteristics of an individual waste container of the waste generator. In some embodiments, the generating of the report comprises formulating a recommendation for one or more improvements to future waste management practices by the waste generator. The one or more improvements can comprise one or more improvements selected from the group consisting of reduced waste volume, reduced waste mass, reduced waste contamination, and increased landfill recovery. In some embodiments, the method further comprises communicating, using the one or more automated computer systems, the generated report. In some embodiments, the waste containers of the waste generator comprise one or more waste container types selected from the group consisting of waste bins, waste bags, waste carts, dumpsters, and compactors. In some embodiments, the plurality of images are acquired using one or more imaging modalities selected from the group consisting of visible light, infrared light, ultrasound, and X-ray.

In some embodiments, the waste containers associated with the waste generator are located in a site selected from the group consisting of a hospital, a research facility, and an industrial production facility, and wherein the waste container contents comprise one or more waste material types selected from the group consisting of hazardous chemical waste, sharps waste, biohazard waste, and radiological waste. In some embodiments, the waste containers associated with the waste generator are located in a site selected from the group consisting of an office space, a retail space, or an academic space, and wherein the waste container contents comprise one or more waste material types selected from the group consisting of paper waste, plastic waste, and food waste.

Also provided are machine-readable non-transitory media embodying information indicative of instructions for causing one or more machines to perform operations for evaluating waste. The operations including acquiring a plurality of images, wherein each of the plurality of images is independently a representation of at least a portion of the contents of a waste container associated with a waste generator, and wherein the plurality of images comprises representations of at least a portion of the contents of two or more different waste containers. The operations further include identifying, for each of at least a portion of the plurality of images, one or more characteristics of the waste container contents represented by the image. The operations further include generating a report based on at least a portion of the one or more identified characteristics.

Also provided are computer systems for evaluating waste. The computer system comprises at least one processor and a memory operatively coupled with the at least one processor. The at least one processor executes instructions from the memory comprising program code for acquiring a plurality of images, wherein each of the plurality of images is independently a representation of at least a portion of the contents of a waste container associated with a waste generator, and wherein the plurality of images comprises representations of at least a portion of the contents of two or more different waste containers. The instructions further comprise program code for identifying, for each of at least a portion of the plurality of images, one or more characteristics of the waste container contents represented by the image. The instructions further comprise program code for generating a report based on at least a portion of the one or more identified characteristics.

BRIEF DESCRIPTION OF THE DRAWINGS

FIG. 5 is an example of a dashboard presenting waste measurement data in a method in accordance with an embodiment.

FIG. 8 presents exemplary screen images showing waste audit client software application functions associated with the listing of prior audits, or the starting of a new audit.

FIG. 11 presents graphs and tables from an exemplary waste audit report in accordance with an embodiment.

Figure 30:
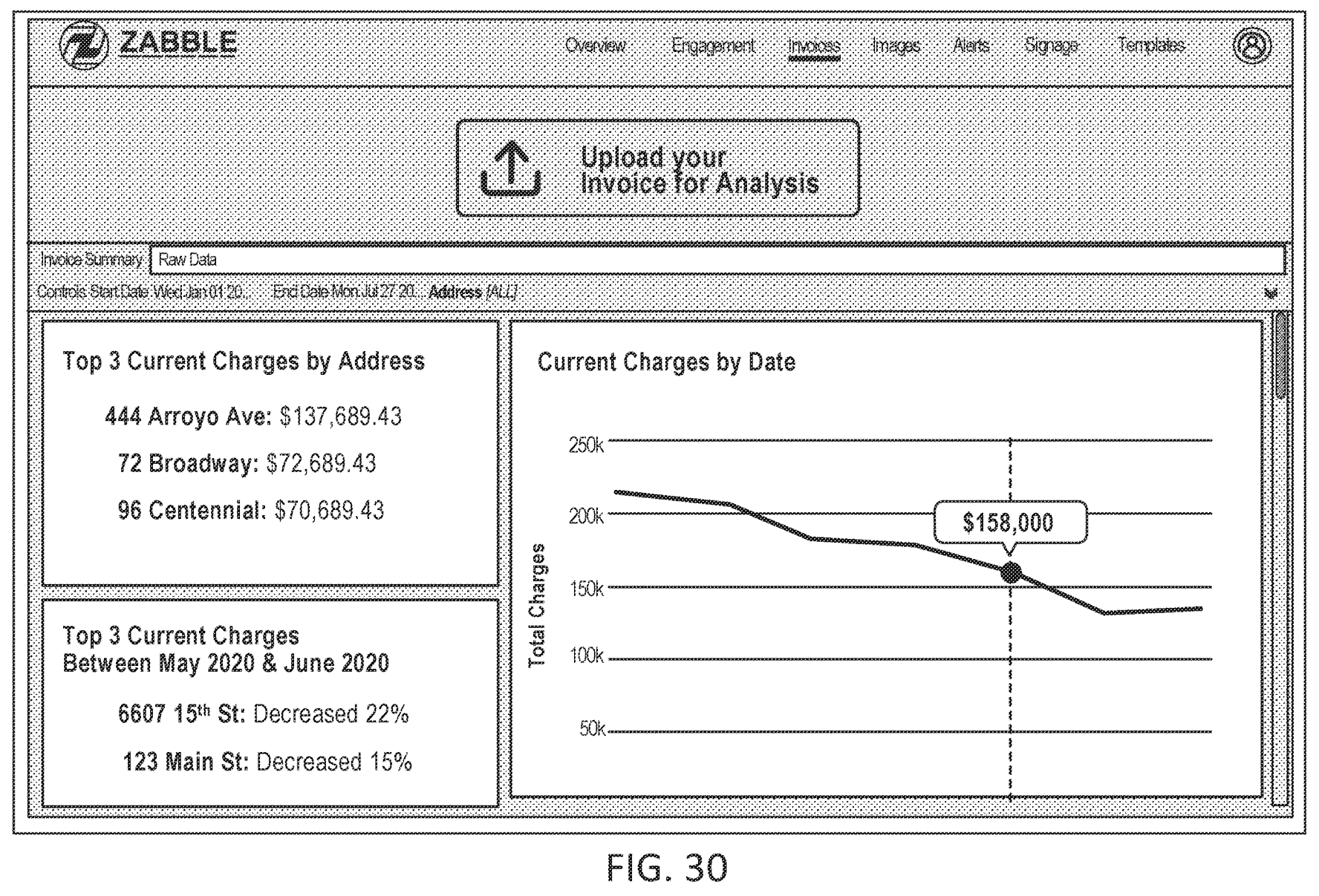

FIG. 30 is a screen image from an exemplary dashboard showing total waste hauling costs and variations per month.

DETAILED DESCRIPTION

I. General

Figure 1:
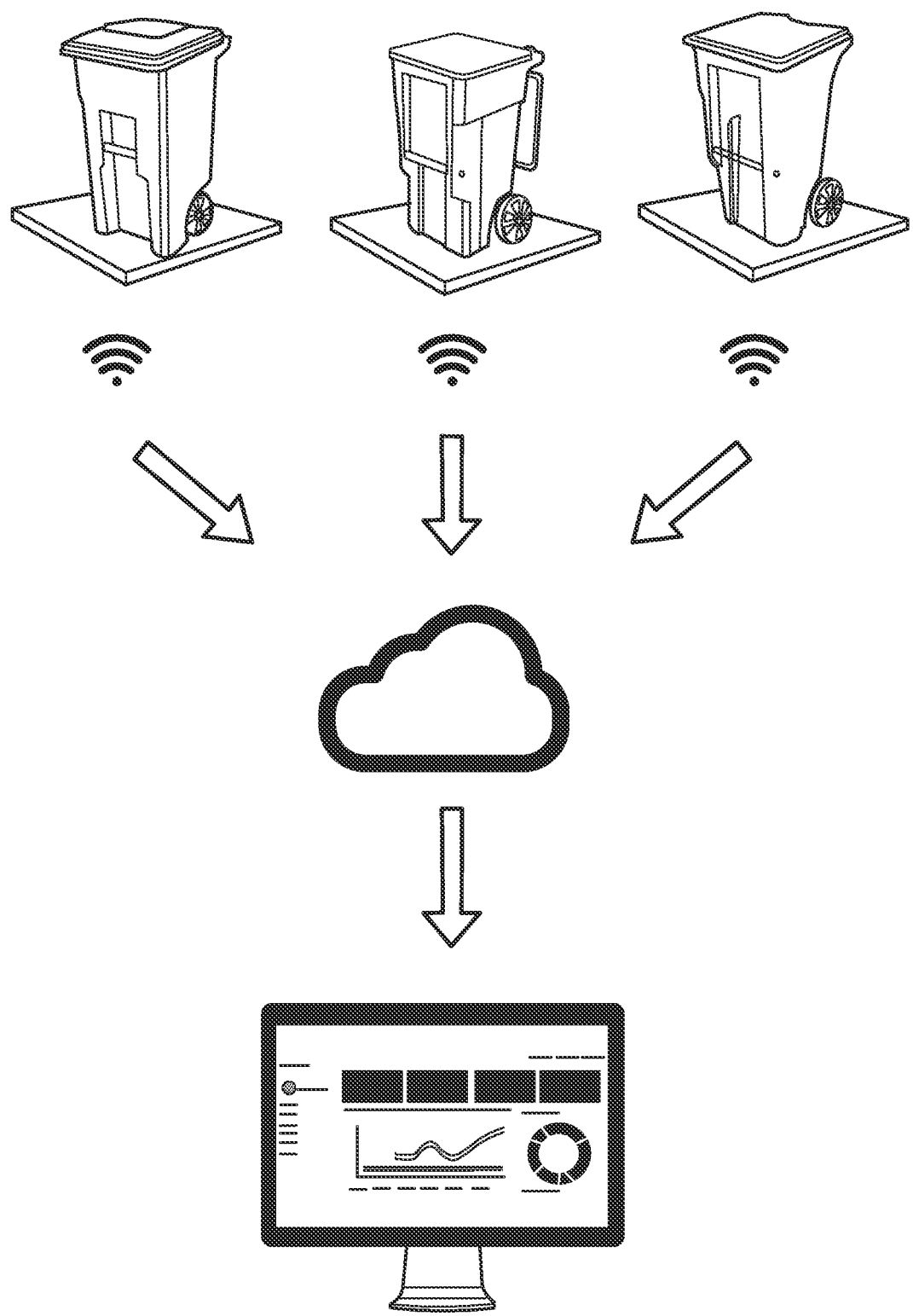
FIG. 1 is a schematic overview of a waste measurement system in which a series of waste measurement devices are used to record waste weight data, the data is transmitted to networked data storage, and the stored data is used to prepare visual reports for an operator.

The present invention generally relates to waste measurement devices, systems, and methods for collecting and transmitting waste weight data. The inventors have discovered approaches for constantly or regularly recording and transmitting waste measurement data to a networked data storage and analysis platform, such that readings from each individual waste bin can be independently monitored and compared with those from other waste bins of the network.

The provided devices, systems, and methods provide several advantages that include an improved ability to monitor trends of waste weight, volume, composition, and other characteristics versus time, location, waste generator, or waste type. The devices, systems, and methods also allow for the generation and presentation of aggregate data related to waste reduction ratings, comparisons with analogous waste generators, and means for connecting waste information with entities such as regulators or consumers. The provided embodiments can also supply information useful to reducing or diverting waste by estimating and predicting waste outputs, and provide a platform for connecting waste generators with waste disposers or parties seeking donated food or other material before it becomes waste. The waste measurement devices can be particularly useful for restaurants looking to take advantage of available trash diversion discounts, reduce waste by constantly monitoring waste types to identify trends in waste production, donate food to charities, or produce energy via aerobic digestion.

The waste monitoring, auditing, and evaluation systems and methods disclosed herein can provide important operational information regarding the quantity, type, service levels, location and condition of materials discarded. Advantageously, and unlike with conventional one-time waste audits, users of the provided systems and methods can create campaigns to collect key operational information quickly and efficiently to get more frequent snapshots of their waste streams. Other benefits can include an intuitive user experience to minimize data entry and training, the reduction or elimination of paper documentation of weigh-ins or fullness levels during a waste audit, the avoidance of errors associated with manual data logging into a spreadsheet, reduced hours required to organize and clean up data for analysis, immediate sharing of insights across teams within seconds to facilitate more rapid improvement actions, event-based and contamination-based notifications to specific users and supervisors, and increased frequency and regularity in waste characterization studies The disclosure allows for the setup of a stratified sampling system, rather than a potentially less efficient exhaustive one, to quantify and categorize waste and contamination and normalize the effect of various confounding factors such as day of the week, seasonality and one-off events. In some embodiments, for example, within a month of daily sampling waste at buildings, waste managers can quickly gain insights into the most frequently observed issues such as contaminants or opportunities for waste reduction. These users can then implement campaigns that immediately focus on the most common identified problem areas to reduce waste, increase recovery from landfill, reduce contamination and save on hauling costs and fines. With continued sampling, a valuable feedback loop can be created and used for validating and iterating upon various hypotheses of the campaign for further improved results.

Examples of the types of waste management information that can be more easily or accurately obtained because of the improvements described herein include waste container fullness (e.g., how full a receptacle, bin, dumpster, compactor, roll-off, front end loader, cart, or bag is), waste item identification (e.g., utensils, cardboard, cups, food waste), waste stream categorization (e.g., municipal solid waste (MSW), dry, wet, recycle, organics, compost, e-waste, bulky, biohazard, hazardous, sharps, pathological, pharmaceutical, trace-chemo, industrial, construction & demolition, litter), waste item count (e.g., frequency of each waste item type), waste item fullness (e.g., how much waste container space each waste item occupies), waste container location (e.g., floor, unit, department, interior versus exterior, GPS information, proximity information), contamination presence (e.g., incorrect disposal of a waste item type in an improper or incompatible waste stream category), and operational and environmental conditions (e.g., overflow, spillage, illegal dumping, missed pickup, required container maintenance or repair). Relevant data can be entered with user-directed input (e.g., through a stationary or mobile computer device) and/or through automatic sampling, sensing, and analysis. By using these methods, systems, and devices, facilities such as universities, hospitals, offices, and retail or hospitality centers can better understand their waste behaviors, optimize the distribution and collection of waste containers, and educate waste generators to reduce production of waste or contamination.

II. Waste Measurement Devices

Figure 2:
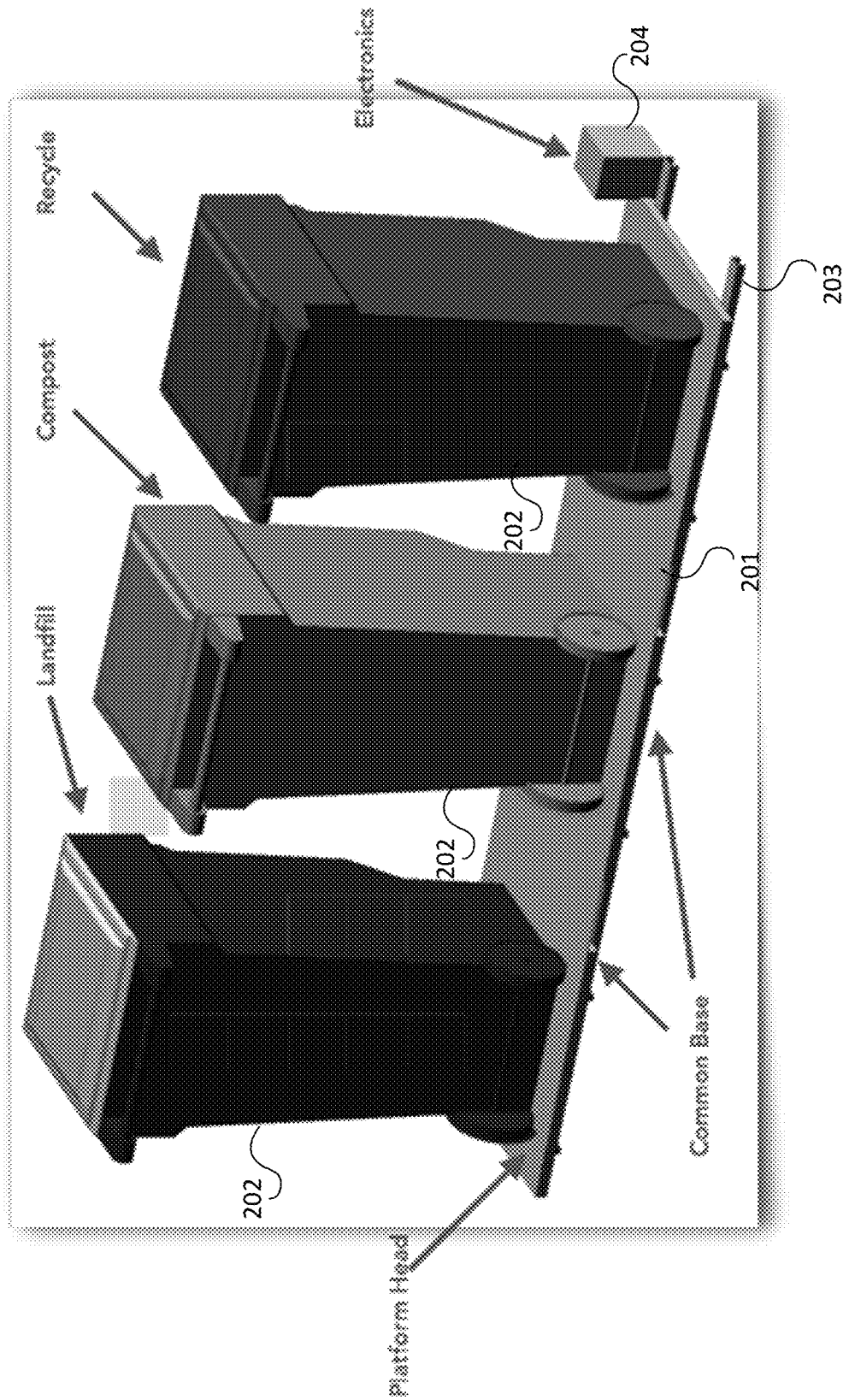
FIG. 2 is an illustration of a waste measurement device for monitoring the waste weight within three bins in accordance with an embodiment.

FIG. 2 illustrate one waste measurement device in accordance with an embodiment. Shown in the figure is a platform 201 that is supporting three bins 202. In the embodiment of FIG. 2, each of the bins is designated for the reception of a different waste type, i.e., landfill waste, compostable waste, and recyclable waste. The bins are configured to be removably positioned on the upper surface of the platform. Mechanically connected to the bottom surface of the platform is a base 203. External to the platform and base, and optionally connected to them, is an enclosure 204 that can contain electronics. The electronics can include, for example, an amplifier, a processor, and a communicator, as discussed in further detail below.

Figure 3A:
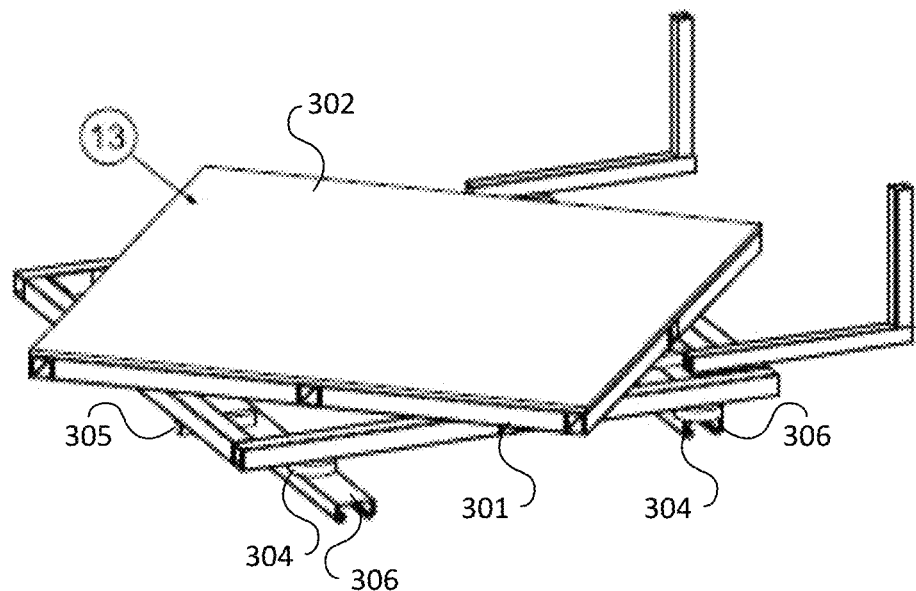
FIG. 3A is a side-view illustration of a platform of a waste measurement device in accordance with an embodiment.
Figure 3B:
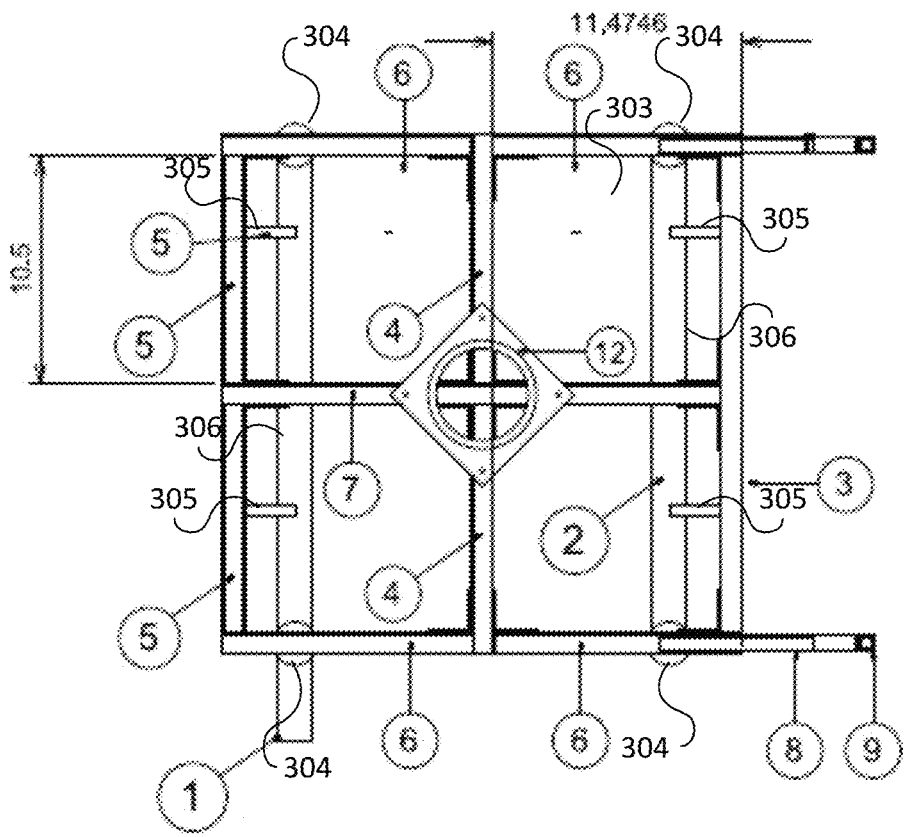
FIG. 3B is a bottom-view illustration of a platform of a waste measurement device in accordance with an embodiment.

FIGS. 3A and 3B illustrate from a side view and a bottom view, respectively, an exemplary platform of a waste measurement device. The platform 301 in the figures has an upper surface 302 and a lower surface 303. An array of load cells 304 and 305 are in mechanical collection with the lower surface of the platform. In the embodiment shown, load cells 304 are compression type load cells, and load cells 305 are beam type load cells. A base 306 is connected to each load cell. The load cells are configured to generate electrical signals having magnitudes proportional to weights of waste material within the chambers of bins placed on the upper surface of the platform.

The platform can include, for example, aluminum, steel, stainless steel, or other metals. The use of stainless steel construction for the platform can allow the platform to be safely positioned at sites prone to inclement weather or corrosive environments. For example, a stainless steel platform can be more robust when used in exterior coastal locations. The upper surface of the platform can include a raised pattern configured to create friction between the platform and the bin floor. The raised pattern can be, for example, in the form of diamond plate. The platform can also include one or more square tubes to add structural support and rigidity to the upper surface.

In some embodiments, the platform is configured to be adjustably extendable in at least one dimension. The extension of the platform can allow for the platform to be adjustably configured to support bins of varying sizes. In some embodiments, the platform is configured to be adjustably extendible in each of two perpendicular directions that are parallel to a plane of the platform upper surface. For example, the platform can have an adjustable length and width that can be selected to accommodate the desired positioning of bins on its upper surface.

The load cell array of the waste measurement device can, for example, be configured to measure weights within the range from 5 pounds to 1000 pounds, e.g., from 5 pounds to 600 pounds, from 100 pounds to 700 pounds, from 200 pounds to 800 pounds, from 300 pounds to 900 pounds, or from 400 pounds to 1000 pounds. The load cell array can be configured to measure weights within the range from 100 pounds to 500 pounds, e.g., from 100 pounds to 340 pounds, from 140 pounds to 380 pounds, from 180 pounds to 420 pounds, from 220 pounds to 460 pounds, or from 260 pounds to 500 pounds. In terms of upper limits, the load cell array can be configured to measure weights of less than 1000 pounds, less than 900 pounds, less than 800 pounds, less than 700 pounds, less than 600 pounds, less than 500 pounds, less than 400 pounds, less than 300 pounds, less than 300 pounds, less than 200 pounds, or less than 100 pounds. This is in contrast to common designs of pit scales, which are typically only rated for the accurate measurement of weights in the range from 1000 pounds to several thousand pounds.

The load cells of the waste measurement device are configured to generate electrical signals having magnitudes proportional to weights of waste material within the chambers of the bin or bins positioned above the load cells on the platform. Each individual load cell of the waste measurement device can be configured to measure weights within the range from 5 pounds to 500 pounds, e.g., from 5 pounds to 300 pounds, from 50 pounds to 350 pounds, from 100 pounds to 400 pounds, from 150 pounds to 450 pounds, or from 200 pounds to 500 pounds. Each individual load cell can be configured to measure weights within the range from 10 pounds to 200 pounds, e.g., from 10 pounds to 120 pounds, from 30 pounds to 140 pounds, from 50 pounds to 160 pounds, from 70 pounds to 180 pounds, or from 90 pounds to 200 pounds.

The load cells can be, for example, beam type load cells. The load cells can be, for example, compression type load cells. In some embodiments, each of the individual load cells includes a Wheatstone bridge. In these cases, the individual load cells can connect directly to an operational amplifier (op-amp). In some embodiments, the load cells of the array are connected to create a Wheatstone bridge prior to connection to the operational amplifier. Electrical signals from the amplifier can be transferred to a processor. The processor can include an analog-to-digital convertor (ADC) that converts the analog signals from the load cells and amplifier to a digital format that can be read by the other components of the processor. The digital signal can be, for example, in a transistor-transistor logic (TTL) compatible format. The digital signal can have an accuracy of, for example, $2^{16}$ bits, $2^{18}$ bits, $2^{24}$ bits, $2^{26}$ bits, $2^{31}$ bits, or $2^{32}$ bits.

Two or more of the load cells of the array can be electrically combined to define a measurement area on the upper surface of the platform. The electrical combination can be via, for example and without limitation, a Wheatstone bridge. In some embodiments, two or more load cells of the array are electrically combined to define a first measurement area, and two or more other load cells of the array are electrically combined to define a second measurement area. In this way, multiple measurement areas can be defined, each with a different combination of load cells. In preferred embodiments, each load cell of the array contributes to only one electrical combination, and as a result, measurement area, of the waste measurement system. In preferred embodiments, each measurement area of the platform upper surface is configured to have one bin positioned on it, such that the electrical combination of load cells associated with the measurement area generates an electrical signal having a magnitude proportional to the weight of waste material in the bin.

In some embodiments, each of the load cells of the array generates an electrical signal having a magnitude proportional to the weight positioned above the load cell on the platform upper surface. An automatic computational algorithm can then be used to determine the positioning of bins on the upper surface based on the electrical signals generated by each of the load cells. The electrical signals can thus be used to dynamically determine a measurement area for each bin, and the algorithm can assign each load cell of the array to one or none of the measurement areas. In this way, the positioning of the bins on the platform upper surface can be allowed to change slightly or significantly each time that the bins are unloaded and reloaded on to the platform, and the measurement areas and assigned load cells will react accordingly to reconfigure for continued measurement of bin and waste weights.

In some embodiments, the platform is connected to the base with a stationary connection. In some embodiments, the platform is connected to the base with a rotational connection. Such a rotational platform can assist with the loading, unloading, or repositioning of one or more bins on the upper surface of the platform. The rotational connection between the platform and the base can be, for example and without limitation, a bearing. The bearing can be, for example, a lazy susan bearing.

The waste measurement device can include one or more shock absorbers incorporated in or attached to the platform, the base, or the bins. In some embodiments, the shock absorbers can reduce stress on the device or its component features as the bin is removed from and returned to the platform. In some embodiments, the one or more bins remain attached to the platform and base during waste emptying, and the shock absorbers can reduce stress on the device or its component features as the device is removed from and returned to the ground. The shock absorbers can comprise springs or pneumatic cylinders.

Each bin of the waste measurement device can have any external shape configured to surround a chamber for receiving and storing waste. The floors and walls of the bin can include, for example and without limitation, aluminum, steel, stainless steel, or other metals. The bin floors and walls can include fiberglass or other woven material. The bin floors and walls can include polyester or other plastics. In some embodiments, the platform, base, and load cell are integrated into the bin floor. Such an integrated system allows for the bin to be easily transported among locations as a single unit.

The waste measurement device can include one or more straps or vice grips to configured to securely attach the bins to the platform. The straps can include hooks that attach to the top and/or side of the bin. The vice grip can be configured to tighten and secure the straps once attached to the bin.

In some embodiments, the waste material received by each bin belongs to a main category of waste. For example, a bin can contain compostable waste, recyclable waste, or landfill waste. In some embodiments, the waste material received by each bin belongs to a sub-category of waste, For example, a bin for receiving compostable waste can be configured to receive food waste or yard trimmings waste. A bin for receiving recyclable waste can be configured to receive plastic waste, glass waste, paper waste, or metal waste. In some embodiments, the waste material received by each bin belongs to two or more sub-categories or main categories of waste.

In some embodiments, a ramp is connected to the platform. The ramp can connect the upper surface of the platform with the surface on which the waste measurement device is resting. The ramp can assist with the loading and unloading of one or more bins onto or from the platform upper surface. In some embodiments, two or more ramps are connected to the platform. In some embodiments, each of the bins includes wheels that are mechanically connected to the bin floors, wherein the wheels are configured to roll along the one or more ramps as the bins are loaded or unloaded on or off of the platform.

The electronics of the waste measurement device can include, for example and without limitation, an amplifier configured to amplify the electrical signals generated by the one or more load cells, a processor configured to convert the amplified electrical signals into a digital signal, and a communicator configured to wirelessly transmit the digital signal. The amplifier, processor, and communicator can each be integrated into the platform, the base, or one or more of the bins. The amplifier, process, and communicator can each be located within an external enclosure that is distinct from the platform, the base, and the bins. In some embodiments, the amplifier is integrated into the platform, the base, or a bin, and the processor and communicator are located within an external enclosure. In some embodiments, the processor is integrated into the platform, the base, or a bin, and the amplifier and communicator are located within an external enclosure. In some embodiments, the communicator is integrated into the platform, the base, or a bin, and the amplifier and processor are located within an external enclosure. In some embodiments, the amplifier and processor are integrated into the platform, the base, or one or more bins, and the communicator is located within an external enclosure. In some embodiments, the amplifier and communicator are integrated into the platform, the base, or one or more bins, and the processor is located within an external enclosure. In some embodiments, the processor and communicator are integrated into the platform, the base, or one or more bins, and the amplifier is located within an external enclosure.

The external enclosure can be located proximate to, or distant from, the platform of the waste measurement device. In some embodiments, the external enclosure is configured to outdoor use. The external enclosure can be, for example, a weather resistant box that meets or exceeds the National Electrical Manufacturers Association (NEMA) 3R or 3S standards for industrial enclosures.

The communicator can receive the digital signals from the processor via wired or wireless transmission. In some embodiments, the communicator has a wired connection to a data display or storage device. The wired connection can include, for example and without limitation, one or more of a serial output port such as an RS-232 or D-sub output port, a Universal Serial Bus (USB) output port, a Digital Visual Interface (DVI) output port, a DisplayPort output port, a Serial AT Attachment (SATA) output port, and a Video Graphics Array (VGA) port) In some embodiments, the communicator has a wireless connection to a data display or storage device. The display device can include one or more lights such as incandescent, fluorescent, or LED lights. The display device can include a monitor or screen that can be a component of a desktop, laptop, or mobile computing device. The storage device can be a local storage device or a network or "cloud"-based storage device.

In some embodiments, the electronics of each waste measurement device are configured to be always or substantially always turned on. In some embodiments, the electronics of each waste measurement device are configure to automatically turn off a pre-determined time after data has been received, processed, recorded, or transmitted. In some embodiments, the pre-determined time is selectable by the user of the device or system. The pre-determined time can be, for example and without limitation, 1 second, 2 seconds, 3 seconds, 4 seconds, 5 seconds, 10 seconds, 20 seconds, 30 seconds, 40 seconds, 50 seconds, 1 minute, 2 minutes, 3 minutes, 4 minutes, 5 minutes, 10 minutes, 15 minutes, 20 minutes, 25 minutes, or 30 minutes. In some embodiments, the waste measurement device collects and/or transmits weight data continuously or semi-continuously while the electronics of the device are turned on. In some embodiments, the waste measurement device collects and/or transmits weight data when a user inputs a signal. The signal can be input, for example, through the user pushing a button. In some embodiments, the waste measurement device includes a controller configured to place the electronics of the device in a low power (i.e., sleep) state for a pre-determined time at regularly periodic intervals, and to place the electronics in a full power (i.e., wake) state for periodic weight data collection. Such cycling of sleep and wake states can allow the waste measurement device to automatically reduce power consumption.

In some embodiments, the waste measurement device does not include bins, but instead includes the platform, base, load cells, electronics, and optional straps as discussed above. In this case, the waste measurement device can be used to retrofit one or more existing bins. In some embodiments, the straps of such a waste measurement device can be used to securely attach a wide variety of bins to the platform to create a physically connected unit.

Also provided is a waste measurement system that can measure the weights of waste carrying bins located on two or more platforms. The two or more platforms of the waste measurement system can be, for example, positioned at different locations within a facility or business that is using the system. In some embodiments, each of the two or more platforms is distributed within a facility to collect waste originating from sources proximate to the platform.

In some embodiments, each of the two or more platforms is configured to receive a different main category or sub-category of waste. In some embodiments, each of the two or more platforms is configured to receive two or more main categories or sub-categories of waste.

III. Modules

Also provided are modules for networking a weight measurement device. The module can have the form factor of, for example, a dongle. In some embodiments, the module physically connects to a weight measurement device, such that data collected by the weight measurement device is transferred to the module, which then transmits the data, in either its original or a processed form, to a data storage network. In a preferred embodiment, the module physically connects to an "off-the-shelf" weight measurement device, such as a scale, and interlinks it with other components and devices of a waste management system. In these embodiments, each scale has its original electronics and functions as supplied by its original manufacturer, and the provided module connects these electronics and functions to a larger network. In some embodiments, the newly connected scales coexist on the same network as any of the provided waste management devices discussed above. The waste management devices that have been connected to the modules can be controlled independently of one another, or two or more such module-connected waste management devices can be consolidated into one controller using a multiplexer.

The module can include a connector configured to couple with a communication port of the weight measurement device. In some embodiments, the connector of the module is a serial connector. The serial connector can be, for example and without limitation, an RS-232 connector, an Ethernet connector, a FireWire connector, a USB connector, or an adapter connecter configured to allow compatibility between two different serial connector types. Similarly, the communication port of the weight can be, for example, an RS-232 connector, an Ethernet connector, a FireWire connector, a USB connector, or an adapter connecter configured to allow compatibility between two different serial connector types.

The module can include a receiver configured to receive a digital signal output by the weight measurement device through the communication port. In some embodiments, the digital signal output by the weight measurement device is an RS-232 signal. The RS-232 signal can include voltage levels that vary between −25 volts and −3 volts for a logic high, and between 3 volts and 25 volts for a logic low. The receiver of the module can include a converter configured to transform the digital signal output by the weight measurement device. In some embodiments, the receiver includes an RS-232/USB to TTL converter that transforms RS-232/USB protocol data transmissions to TTL signals. The TTL signals can include voltage levels that vary between 3.3 volts and 5 volts for logic high, and are 0 volts for logic low.

The module can include a controller, such as a microcontroller. The controller can include at least one processor and a memory operatively coupled with the at least one processor. The processor of the controller can execute instructions from the memory that can include program code. The program code can be, for example, for receiving, processing, and/or transmitting data received from the weight measurement device.

The module can include a transmitter. The transmitter can be configured to wirelessly broadcast data based on the received digital signal. The transmitter can be configured to use a wired connection to broadcast data based on the received digital signal.

Any of the electronic elements described above can also be included in the provided waste measurement devices and systems. For example, one or more of the described connectors, receivers, controllers, or transmitters can be included in the bins, platforms, bases, or external enclosures of the provided waste measurement devices and systems.

IV. Methods and Systems for Waste Monitoring

Also provided are methods for monitoring waste by, for example, using any of the provided waste measurement devices, modules, or systems discussed above. In one aspect, the waste monitoring method includes collecting with a computer system the data broadcast by each of the devices of the system. In some embodiments, one or more controllers are configured to receive digital signals transmitted from the waste measurement devices, modules, or systems, and to relay, transmit, or broadcast data to the computer system based on the received digital signals. The method can further include storing in a memory the data collected by the computer system. The method can further include analyzing the stored data with the computer system. The analyzing can include various manipulations and interpretations of the stored data. In a preferred embodiment, the analyzing includes monitoring the weights of waste material within each chamber of the bins of the waste measurement device or system over time.

Figure 4:
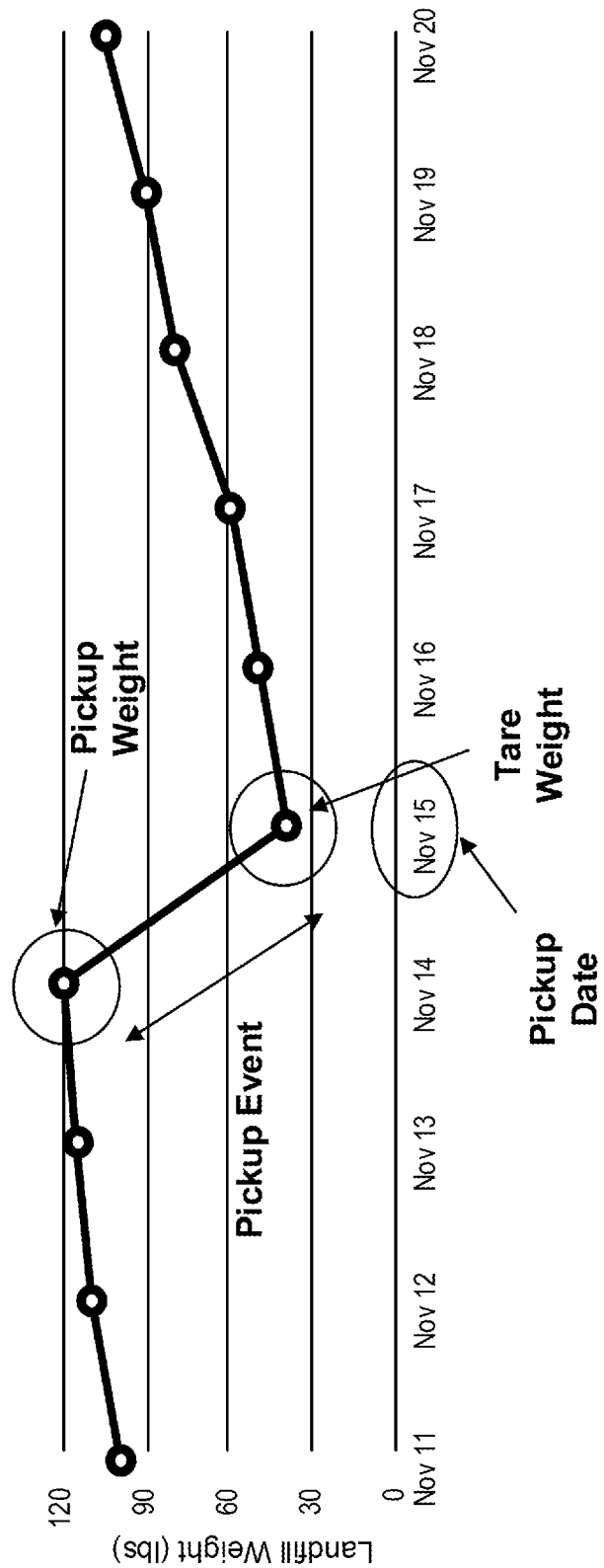
FIG. 4 is an example of a graph of waste weight over time used to identify a pickup date and designate a tare weight in a method in accordance with an embodiment.

In some embodiments, and as illustrated in the graph of FIG. 4, the analyzing of weight data from the waste measurement devices allows for the detection of a pickup event during which the bins of a waste measurement device have been emptied. The terms "pickup event," "pickup date," or "pickup time" are used to refer to the event, date, or time at which one or more bins of the waste measurement device or system are at least partially emptied. In some embodiments, during the pickup event, one or more bins of a waste measurement device are removed from the top surface of the platform of the device, at least partially emptied, and returned to the device platform. Pickup events can be, for example, associated with the collection of waste by a municipal or commercial waste service employed to remove waste from the business, residence, or facility where the waste measurement device is being used.

As shown in the example of FIG. 4, the weight of a bin of the waste measurement device or system is measured over time, and a decrease in weight of waste material within the chamber of the bin is calculated. The waste decrease weight can be calculated, for example and without limitation, as a change in weight per minute, a change in weight per hour, or a change in weight per day. Once calculated, the decrease in weight over time can be compared to a pre-determined target value. The target value can be selected to prevent or minimize the likelihood that a waste weight decrease rate incorrectly triggers a designation of a pickup event. For example, the target value can be set to filter out small decreases in weight caused by evaporation;

by the removal of an incorrectly disposed item; or by measurement fluctuations, noise, or other errors. If the decrease in weight over time equals or exceeds the target value, then the time at which this decrease is recorded or calculated is designated as a pickup event.

In some embodiments, a second criterion can be used to determine a pickup time. For example, a maximum empty weight can be selected, such that the combined weight of a bin and its contents must fall below this maximum empty weight for a pickup time to be designated. This can provide another technique to prevent or reduce the occurrence of false positive calculations being used to designate a pickup event.

In some embodiments, and as shown in FIG. 4, the designation of a pickup time is accompanied by a setting of a tare value. The terms "tare value" or "tare weight" are used to refer to the weight of a bin that has been emptied, i.e., during a pickup event. The weight of a bin can vary somewhat after each pickup, as a pickup may not remove all waste material from within the bin. For example, at least a portion of waste material may adhere to the walls of floor of a bin, increasing the likelihood that the adhered portion is not removed during standard pickup procedures. If the actual weight value of the bin alone is used to represent a tare value in such cases, the measured weight of waste deposited within the bin between pickup events will be overestimated. The provided methods can reduce these overestimations by adjusting the tare value after each pickup to account for any gained or lost weight associated with the bin.

In some embodiments, the method includes, in addition to calculating a decrease in bin weight and comparing the decrease to a target value as described above, designating a tare weight value for the bin or chamber when the weight decrease over time equals or exceeds the target value. In these cases, the pickup time is identified as previously discussed, and a revised tare value is then associated with this pickup event. The revised tare value can be, for example, the weight associated with the bin at the time immediately after the pickup event has been identified. For each subsequent measurement before the next pickup event, the total weight of the bin and its waste contents is then subtracted from the revised tare value to calculate the amount of waste material that has been added to the bin since the previous pickup event.

The waste measurement data can also be used to calculate the amount of waste removed from each bin during each pickup event. For example, the weight of a bin that is measured immediately before an identified pickup event can be designated as a final weight for the bin. The bin tare weight immediately prior to the pickup event can then be subtracted from the final weight to result in a collected waste weight. In this way, a collected waste weight can be calculated for each bin emptied during a pickup event, and a collected waste weight can be calculated for each pickup event in which a bin has been emptied.

By calculating a collected waste weight for each bin emptied during a pickup event, the distribution of waste among the bins can be analyzed. In some embodiments, this distribution provides information about variation among waste types that have been collected. For example, the amount of landfill waste, compostable waste, and recyclable waste that have been collected can be compared. This comparison can be used in various ways to improve the efficiency, environmental impact, and cost of waste collection and disposal. In one embodiment, the measured and calculated waste distribution among waste types is used to compute the amount of one or more waste types that needs to be diverted to one or more other waste types to meet a regulatory or financial target. In another embodiment, the measured and calculated waste distribution among waste types is used to compute optimal bin sizes to be allocated for each of the waste types.

In another embodiment, the measured and calculated waste distribution is assigned a score, rating, or rank. This score can be associated with the business, residence, or facility, and can be compared to target scores, or to scores that have been similarly calculated for other businesses, residences, or facilities. For example, a waste disposal service provider, governmental department, or community group can set a target score to be achieved, and provide incentives or penalties for those sites that have scores that are better or worse, respectively, than the target score. As another example, a score can be publicized by a commercial business as an advertisement to customers seeking sustainability information to inform their purchasing decisions.

In some embodiments, the distribution analysis of waste among the bins provides information about variation among locations from which waste has been collected. For example, a business or facility can have multiple waste measurement devices distributed among different locations within its property. The distribution data can then be used to compare waste generation and collection information from among these different locations. The comparison can be used to relocate waste measurement devices to optimize their spatial distribution within the facility. The comparison can also be used to identify those locations within the facility that are responsible for the highest or lowest rate of waste generation.

By calculating a collected waste weight for each pickup event in which a bin has been emptied, the distribution of waste over time can be analyzed. In one embodiment, the measured and calculated waste distribution over time is used to compute predictions for optimal pickup event timing. In one embodiment, the measured and calculated waste distribution over time is used to compute seasonal or other periodic changes in the overall amount of waste collected for one or more bins.

In some embodiments, the analyzing of weight data from the waste measurement devices allows for the detection of a disposal event during which waste material has been added to the bins of a waste measurement device. The terms "disposal event" or "disposal time" are used to refer to the event or time at which waste materials have been added to the one or more bins of a waste measurement device. In some embodiments, the waste measurement device records the weight increase of each disposal event. In some embodiments, the waste measurement device records the time of each disposal event.

In some embodiments, the waste measurement device records for each disposal event the identity of the individual user who has deposited waste material in the device. The identification of the user can include the detection of a signal with a sensor associated with the waste measurement device. The identification of the user can further include the transmission of a signal from a device associated with the user. The signal can include, for example, a Bluetooth signal, or a radiofrequency identification (RFID) signal. The device can be a passive or active RFID tag. The device can be a smartphone. The smartphone can be operating an application used to communicate the signal from the user to the waste management device.

In some embodiments, the waste measurement device records information about the chemical content of waste that has been deposited within the one or more bins. The chemical content can be used to classify the type of waste material within the bin chambers. For example, sensors within bins configured to receive compostable waste can be used to detect ethanol, or biogenic amines such as cadaverine and putrescine, each of which can be associated with food spoilage. A combination of different gas sensor types can be used to detect chemical components sufficient to categorize a composting food type as, for example, meat, dairy, bread, fruits, or vegetables. As another example, sensors within bins configured to receive recyclable waste can measure the visible or infrared absorbance of waste materials that are added to the bins. The absorbance measurements can be used to categorize recyclable material types as, for example, types of plastics or types of paper. The sensors can be fitted inside each bin, on the bin walls, or under the bin lid. In some embodiments, the data measured by sensors with the waste measurement devices is used to minimize or prevent the occurrence of waste types being discarded in the wrong bin type. For example, if the sensor data does not match expected values for an acceptable waste type, or if the sensor data does match expected values for an unacceptable waste type, the waste measurement device can generate an audible or visible signal, or can divert the waste away from the bin chamber.

Also provided are methods that include displaying data that has been measured, processed, or analyzed by the waste measurement devices and systems. The displaying can include generating a graphical and/or textual summary, e.g., a report, of one or more metrics associated with the waste measurement. The summary can include, for example and without limitation, weights of waste contained within one or more bins, scores or ratings as discussed above, amounts of energy and/or greenhouse gases saved through waste allocation and/or reduction, or comparisons of waste measurement data from the current residence or facility and analogous other residences or facilities. Any of the summary data can be presented using current or historical data. Any of the summary data can be presented in the form of one or more graphs depicting change over time.

The summary can be displayed by presenting on, for example, a monitor or screen. The monitor or screen can be attached to the waste measurement device. In a preferred embodiment, the monitor or screen is an element of a user interface that accesses the displayed summary by connecting to networked data storage. The user interface can be displayed with, for example, a desktop computer, a laptop computer, a mobile computer, a tablet, or a smartphone.

FIG. 5 presents an example of a data summary in the form of a "dashboard" of multiple windows, each providing a visual representation of waste measurement data or calculations. In the example shown, window 501 displays the weight of the total waste measured during a selected time period, as well as the waste measured of each of three types (i.e., landfill waste, compostable waste, and recyclable waste) measured during the time period. Window 501 also presents information about the amount trash diverted during the time period, and an estimated cost savings associated with this trash diversion. Window 502 provides a waste reduction tip relevant to the individual user or establishment, along with an estimated cost savings that can be realized by implementing the suggestions of the tip. Window 503 is a graphical representation of the weight of waste of each type added to the bins of the waste measurement device or system during different time periods. In the example shown in FIG. 5, the time periods are days of a week, the weights are reported in pounds, and the data for weights measured for each day are connected in the form of line graph. In the example, the time scale of the graph can be selected by the user to show weigh information over the time course of an hour, a day, a week, or a month. Window 504 presents a scatter plot in which one point depicts the total waste and trash diversion for the user, and other points depict analogous data for comparable or similar users. The comparison can be among different individuals or different commercial establishments. As shown in FIG. 5, a filter can be applied to the comparison to select the points presented in the scatter plot. For example, the data can be filtered such that only points related to restaurants serving a particular cuisine type, or located within a particular city or other geographical region, are shown. Window 505 shows two line graphs estimating energy savings and greenhouse gas savings during different time periods within a selected time range. As with other graphs of the dashboard, the units of the data, and the lengths of the time periods, can be selected by the user.

Systems that incorporate the waste measurement device are also provided. Systems can include, for example, computer systems, electrical systems, power supplies, power regulators, and other elements enabling the operation of the apparatus. An electronic system can, for example, supply power to the load cells and option sensors, and transmit data to networked storage. In some embodiments, the electronic system includes a "sleep" option configured to turn off the power supply for predetermined or selected periods of time. Theses time periods and other parameters of the waste measurement device can be configured to be easily programmable or user selectable through an interface. In some embodiments, the waste measurement device includes one or more internal power supplies, such as batteries, that can operate the device in the absence of external power. The batteries can have a power supply, for example, sufficient to operate the device for a period of several days. The batteries can be, for example, lithium ion batteries. The batteries can be rechargeable. In some embodiment, an alternate energy source can be used to supply power to the device. Alternate energy sources can include, for example and without limitation, solar power from solar cells, energy from fuel cells, or gas provided by anaerobic digesters powered by the waste collected within the device. In some embodiments, the device has substantially self-sustainable energy.

Also provided are methods for monitoring waste using visual assessments. In some embodiments, the visual assessment methods use a mobile device (e.g., a smartphone or tablet computer) hardware and software platform. These alternative methods provide certain advantages when the use of a scale is an unavailable or less desirable. For example, in understanding the sources of waste generation, diversion, and contamination within a building or across a site including multiple buildings, it can be prohibitive to use a relatively bulky scale to measure the weight of every waste container in the building or site. This is particularly the case when a large number or variety of tenant suites, kitchen areas, restaurants, open mall areas, and/or businesses, each with their own waste container bins, reside within the building or site to be monitored, assessed, and audited. By not requiring a scale for measuring waste weight, the visual assessment waste monitoring methods disclosed herein can therefore advantageously be used to quantify and categorize waste streams, record waste locations, and assess many external factors to thoroughly characterize the consumption and disposal behavior of, for example, entities within a building. Waste containers suitable for use with any of the methods provided herein can include, for example and without limitation, any combination of waste bins, waste bags, waste carts, dumpsters, compactors, or the like. The waste containers can generally include any container type used by a waste generator to store and collect waste. In some embodiments, the waste containers of then provided methods include all such containers used by a waste generator before delivery to, or pickup by, a waste hauling and/or disposal service.

In some embodiments of the provided method, images of the waste in each of the containers are used in association with location information and other parameters such as suite information, tenant information and other demographic or event based data such as fullness levels, certain specific waste types, overflows, illegal dumping, contamination, or missed pickups. The data can be either manually entered via a software application, or automatically computed via algorithms. The visual images are then rapidly and automatically analyzed to report, for example, waste generation, diversion, contamination, and/or greenhouse gas emissions from different sources. Notification emails or messages or prompts can be delivered to stakeholders upon encountering events such as contamination, detection of certain types of materials such as e-waste, universal waste, overflows, illegal dumping or missed pickups. In addition, the volume of the materials in the containers can be calculated based on data such as the total size of the containers, the percentage fullness and frequency of pickups. Contamination can also be calculated based on the volumetric amount of the contamination and the total measured volume of material in the containers. To calculate greenhouse gas emissions based on LCA models, widely accepted density information for waste types published by local, state, or federal authorities or privately held institutions can be used to convert volume to weight.

V. Methods and Systems for Waste Auditing

Also provided are methods for performing a waste audit, optionally using any of the provided waste measurement devices, modules, or systems discussed above. A waste audit is an analysis of a waste stream generated by one or more facilities. The facility can be, for example, a building, office or retail location, apartment complex, restaurant, school, hotel, single- or multi-family residence, or industrial recycling facility. The purpose of the waste audit is generally to identify, for example, categories of waste materials (e.g., plastic, paper, cardboard, organics, etc.) present in the facility waste streams, quantities of materials within each category, the locations and origins of the waste, the identification of contaminations within the waste streams, and trends with respect to historical patterns. Using the information recorded, analyzed, and reported in a waste audit, facility owners, employees, users, residents, and/or municipalities can better take informed steps towards meeting goals such as increasing waste diversion from landfills and incineration, reducing contamination, and rethinking purchasing and inventory decisions and procedures.

In a conventional waste audit methodology, custodial or janitorial staff of a facility or consulting service collect waste from a typical day or other predetermined time period, and deposit, for example, bags holding this waste into a staging area. Waste audit personnel then manually sort the trash into different other bags or containers based on individual waste categories such as plastic, glass, food, etc. These sorted bags and containers are then weighed manually. The waste categories can sometimes be fixed and granular (PET, HDPE, PP, PS, food waste, etc.), and can depend on specific requirements from businesses wanting to understand their particular waste stream or their compliance with regulations associated with certifications such as LEED or those of various governmental organizations. The contents of the waste bags are sometimes strategically sampled to uniformly distribute the weight across a set of locations of interest (e.g., floor, room, suite, or GPS location) or across types of generators (e.g., commercial, multi-family, residential, or industrial), or to limit the contents to sub-samples below a certain weight threshold (e.g., 50 lbs or 250 lbs). In such cases, the relative proportion of waste in each of the categories or sub-samples is measured, rather than absolute weight. The audit data is collected on a sheet in the form of two types of identification. The first identification type relates to the particular facility being audited and can include, for example, facility name, address, occupancy, waste hauler, or janitorial staff. The second type of information relates to the waste being measured and can include, for example, waste categorization, quantity (e.g., weight, volume, or number of items), waste origin (e.g., building, floor, room, GPS location), pictures, videos and other notes. The collected information is typically typed into a spreadsheet in the form of multiple sheets of paper or software data. Information from one or more spreadsheets are then collated from multiple sources to plot charts, summarize the results, and generate a report containing, for example, total tonnage, diversion efforts, material breakdown, potential cost savings, areas of improvement, and net environmental impact. With this conventional methodology, the process of transcribing, analyzing, reporting, and sharing results with stakeholders typically take hours, days, or weeks per audit depending on the size of the audit being performed.

In contrast, the disclosed methods and systems for waste auditing deviate from these conventional approaches, e.g., after separation of the collected waste into different material types. In one aspect of the provided methods, rather than weighing the separated materials and manually entering information into a spreadsheet, a waste auditor with the disclosed methods and systems can advantageously instead use a scale connected to, for example, a mobile tablet or phone. The tablet, phone, or other processing device can communicate or relay information through, for example, a hard wired cable with an RS-232 or USB adaptor, or wireless means via Bluetooth, WiFi or other wireless technologies and protocols. The system can also include a stand to house the tablet/phone, wherein the stand can be connected to or separate from the scale. The sensing unit, data collection unit, and display are configured to be portable as, for example, the scale can contain wheels so it can be easily transported. The mobile tablet or phone can be detachable and removably attachable in certain aspects using a wireless data connection with the scale.

Figure 6:
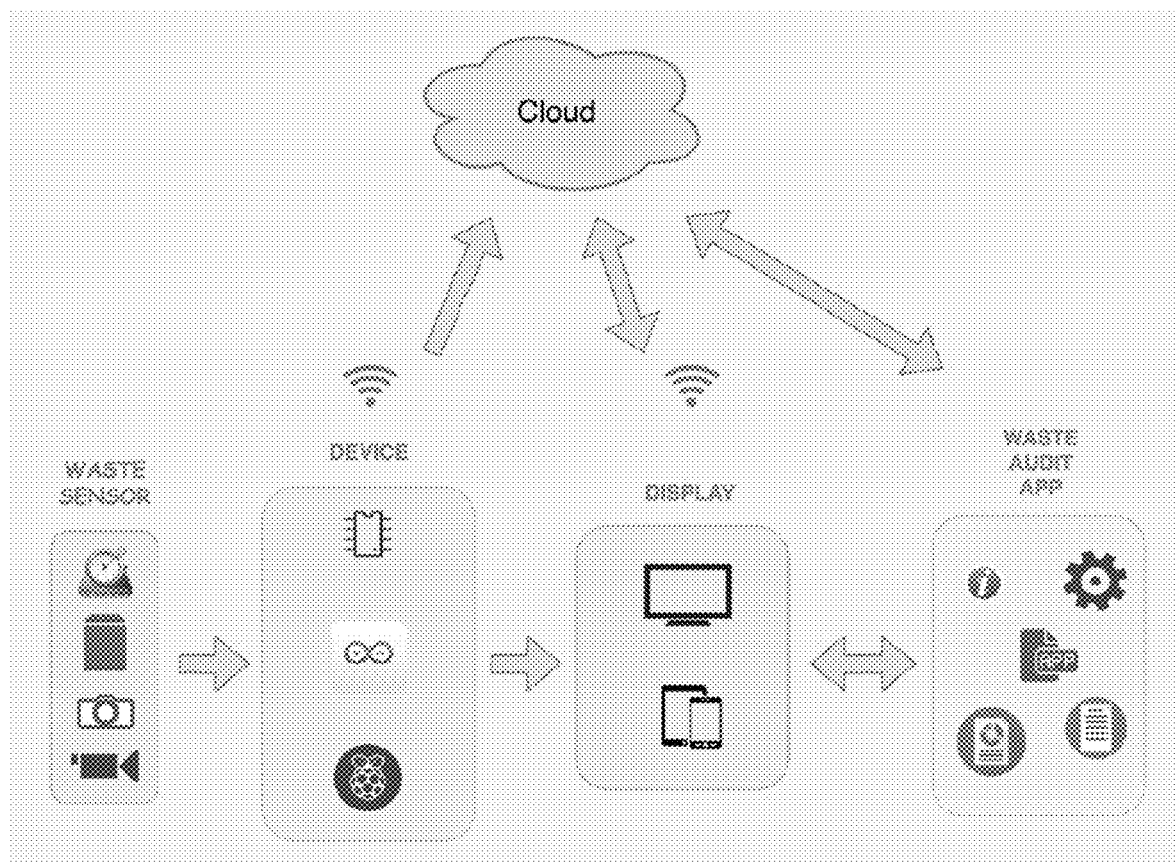
FIG. 6 is a schematic illustration of a waste auditing system in accordance with an embodiment.

In general the disclosed system or platform includes: (1) a sensing unit (e.g., waste sensor) such as a scale, microphone, camera, or a smart phone; (2) a data collection unit such as smart phone, tablet, Raspberry Pi-based processor, Arduino-based processor, or other computing device with a wireless transmitter such as Bluetooth, ZigBee, LoRa, Wifi, and other variants and methods; (3) an optionally touch-screen display unit (display) such as an LCD, LED, or OLED screen of a smart phone or tablet or standalone display; (4) a waste audit client software application (e.g., a mobile application or web-based application); and (5) a waste audit server software (e.g., cloud-based) application that functions to store data, perform analytics, and generate reports. Two or more of the different units of the system or platform can be combined within a single device, or the units can operate separately. For example, a device such as a smart phone or tablet can play the role of both a data collection unit as well as a display. FIG. 6 shows a schematic overview of the disclosed waste auditing system.

The sensing unit of the system is used to capture quantitative information regarding the waste, such as, for example, waste weight and volume. The weight can be captured using a scale comprised of load cells, piezoelectric sensors, and/or pressure sensors. The volume can be captured via a variety of sensors including but not limited to infrared and ultrasonic sensors. Alternatively or additionally, the weight or volume can be estimated using computer vision analysis of image data. Other information collected by the sensing unit can relate to the category of waste (e.g., plastic, paper, or food waste), the origin of waste (e.g., building, floor, cafeteria, office, GPS location, commercial source, residential source, multi-family source, or industrial source) and miscellaneous information pertaining to contamination of waste, bin fullness and/or overflow, recycling/composting options, and other observations. The captured waste volume can then be converted to weight, or vice versa, using predetermined material densities for each combination of material types in the waste container. In the absence of, or as a supplement to, information captured via a sensor, data can be manually entered or supplied via voice interaction or through pictures and videos using the waste audit client software application accessible on the data collection unit or display unit. The data can also be collected and/or integrated using third-party information that already exists. Examples of this third-party information include building management system, waste hauler data invoices, historical sustainability reports, private databases, and municipal databases from, for example, local, state, or federal sources.

The data collection unit of the system is responsible for collecting raw data to be wirelessly uploaded to the cloud-based server software for further cleaning and aggregation. Typical wireless protocols include WiFi, Bluetooth, LoRa, NFC, and others known to one of skill in the art. Some amount of processing can be performed on the data collection unit itself when the conditions such as computing power, bandwidth, and battery life make it feasible. The data collection unit can be a simple IoT processor such as Arduino, Raspberry Pi, or Particle Photon, or can be a more complex device such as a smartphone, tablet, or laptop computer.

The display unit of the system can either be a part of the data collection device, as is the case with a smartphone or tablet or computer, or can be a standalone unit. The display can be, for example, an LCD, OLED or LED screen. The display can be handheld, table top, or mounted to a pedestal or wall. The display can be interacted with via external peripherals, such as for example, a keyboard, mouse or stylus. The display can have touchscreen functionality. In some embodiments, the display can be operated via hands-free voice interaction. The system can include multiple display units located at different locations within a facility to display live data as the audit is being conducted, and/or the results of the audit after completion.

The waste audit client software application of the system provides an interface for a user to interact with the waste auditing platform. Data entered into the system by the sensing unit or other methods can be displayed or otherwise presented using the application. In some embodiments, the software allows a user to start a new audit or to browse pending and/or completed audits. In some embodiments, the audits are automatically created when a trigger event is detected. In certain aspects, the trigger event is a contamination event occurring when a different date type in detected in a certain container in real-time or during a predetermined period of time. In certain aspects, the trigger event is a timing event occurring a certain length of time, e.g., a few hours, prior to a pickup event during which the waste containers is to be picked up. In certain aspects, the trigger event is an overflow event occurring when a waste container detects overflow of its contents.

When a user starts a new audit, the client software can call for the user to enter waste related details about the audit such as (1) information about the organization conducting the audit such as its name, address, audit staff, etc.; (2) information about the facility where the audit is being conducted such as its name, address, waste hauler, janitorial company, and past tonnage and diversion rates; (3) information about the audit itself such as audit period, waste stream, containers, material types, quantity, pictures, notes on contamination, missed pickups, overflows, or other conditions and observations. In some embodiments, one or more of these information types is automatically populated in response to one or more signals from the sensing unit, or in response to past behavioral patterns. The user can also view information related to audits that are still pending or those that have already been completed. In certain aspects, the user can use search criteria such as, for example, date or location, to more easily access desired past or future audits to review. The search results and audit information can be displayed as, for example, a list or a map.

Figure 7:
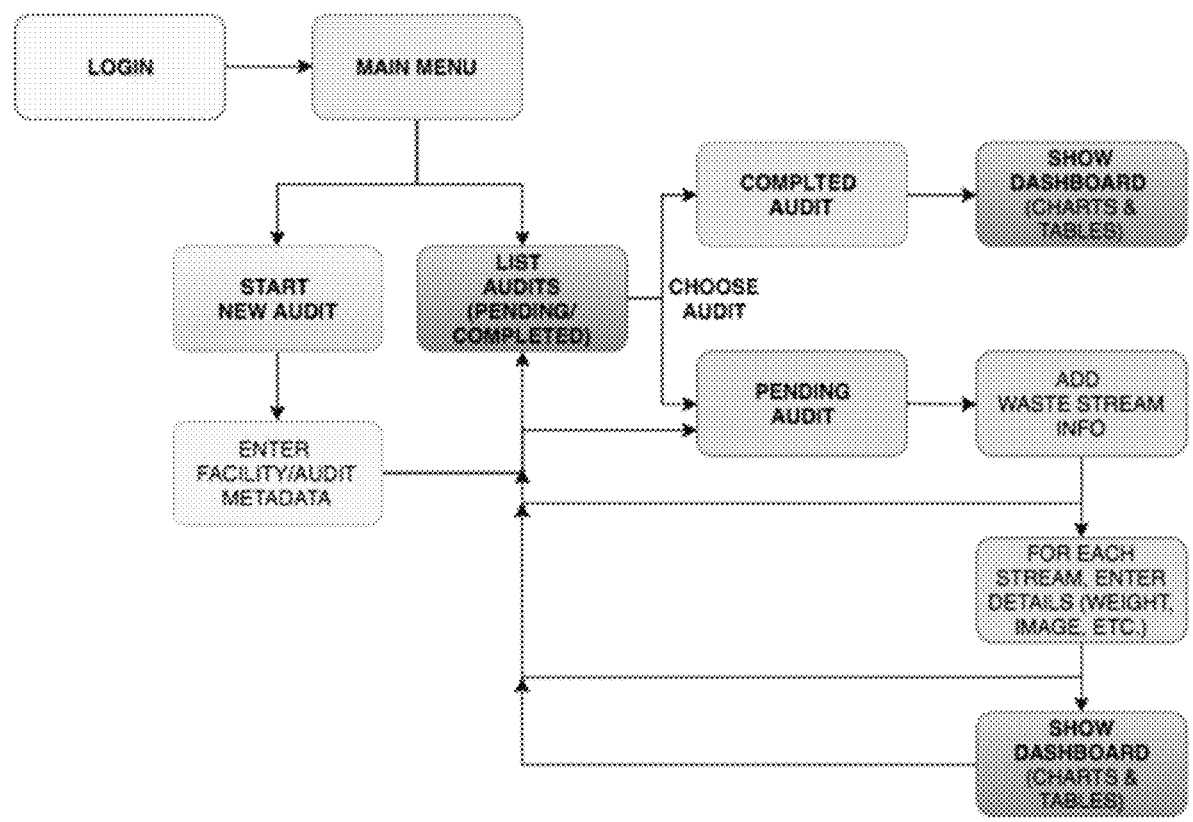
FIG. 7 is a schematic illustration of a user process flow in a waste audit client software application in accordance with an embodiment.

The material type can be organized based on the most common material types in the particular facility being audited, and/or material types pre-defined by a certification program such as LEED, TRUE Zero Waste, or others instituted by governmental organizations such as the Environmental Protection Agency and CalRecycle. Each sorted material type can be associated with information related to a weight measurement from a scale, manual entry, or voice control; origin; pictures or videos; or special notes regarding the waste state such as contamination, fullness at origin, etc. Completed audits can have data analyzed and compiled into charts, tables and/or a breakdown summary of the waste stream during the audit period in terms of material types, diversion rates, contamination, and net environmental impact. The economic and environmental impact of the waste stream can be computed using Life-Cycle Assessment models (LCA) such as EPA's WARM. Various statistical and machine learning models can be applied to the data to, for example, suggest top areas of improvements, calculate a building score, and compare this score to those of other facilities based on geography, demographics, size, waste diversion, efficiency and environmental impact. FIG. 7 illustrates an exemplary user process flow within the waste audit client software application.

After the data has been captured using the waste audit client software application interface, the data is transmitted to the cloud-based waste audit server software for storage. The stored data can be retrieved for analysis and computations of metrics. The analysis can be computed in the cloud using the waste audit server software, or on the data collection unit using the waste audit client software. Aggregated results can then displayed on the dashboard section of the waste audit client software application for completed audits. The data can be stored securely such that it is only accessible to authorized users.

Figure 8:
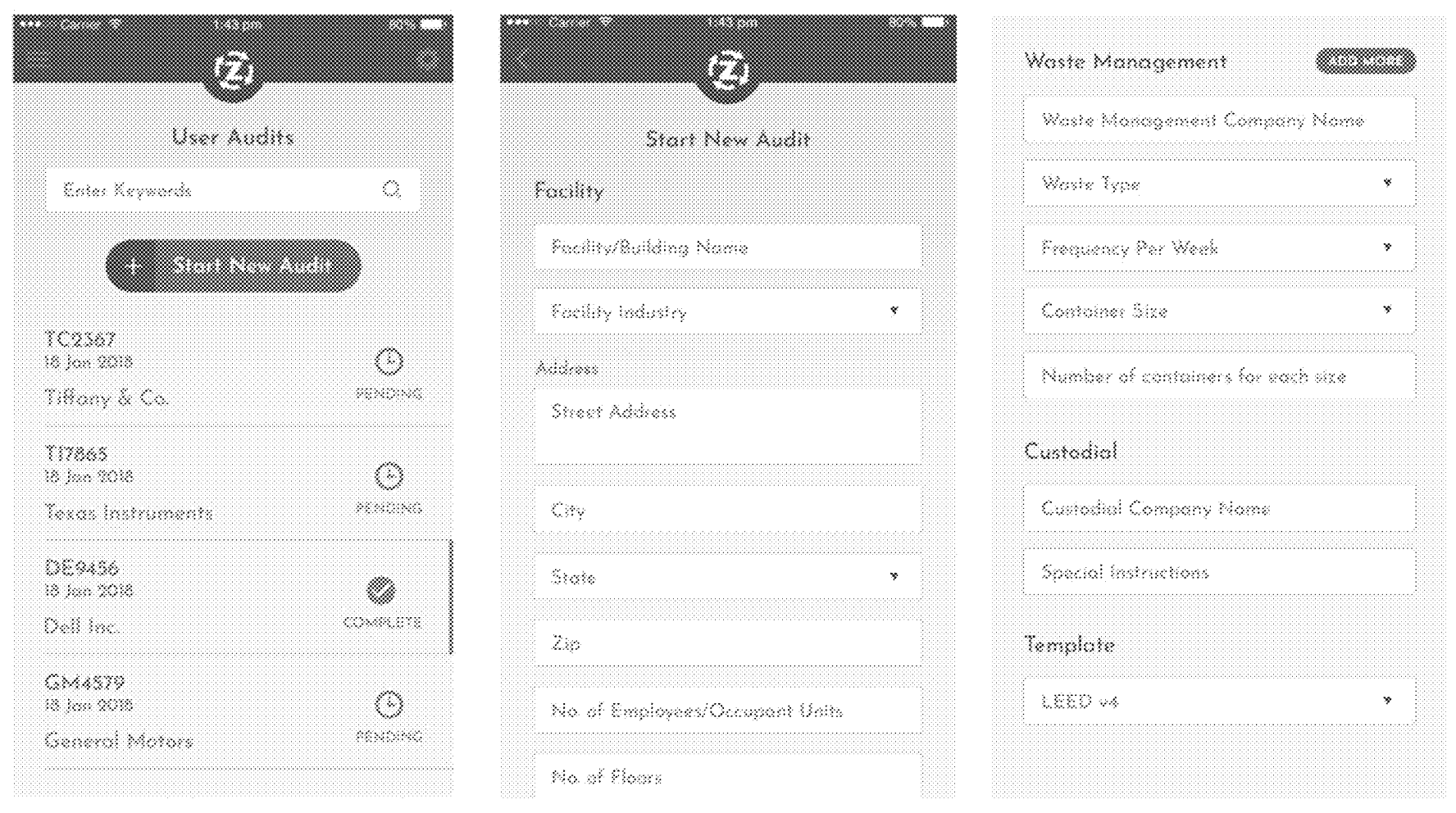
Figure 9:
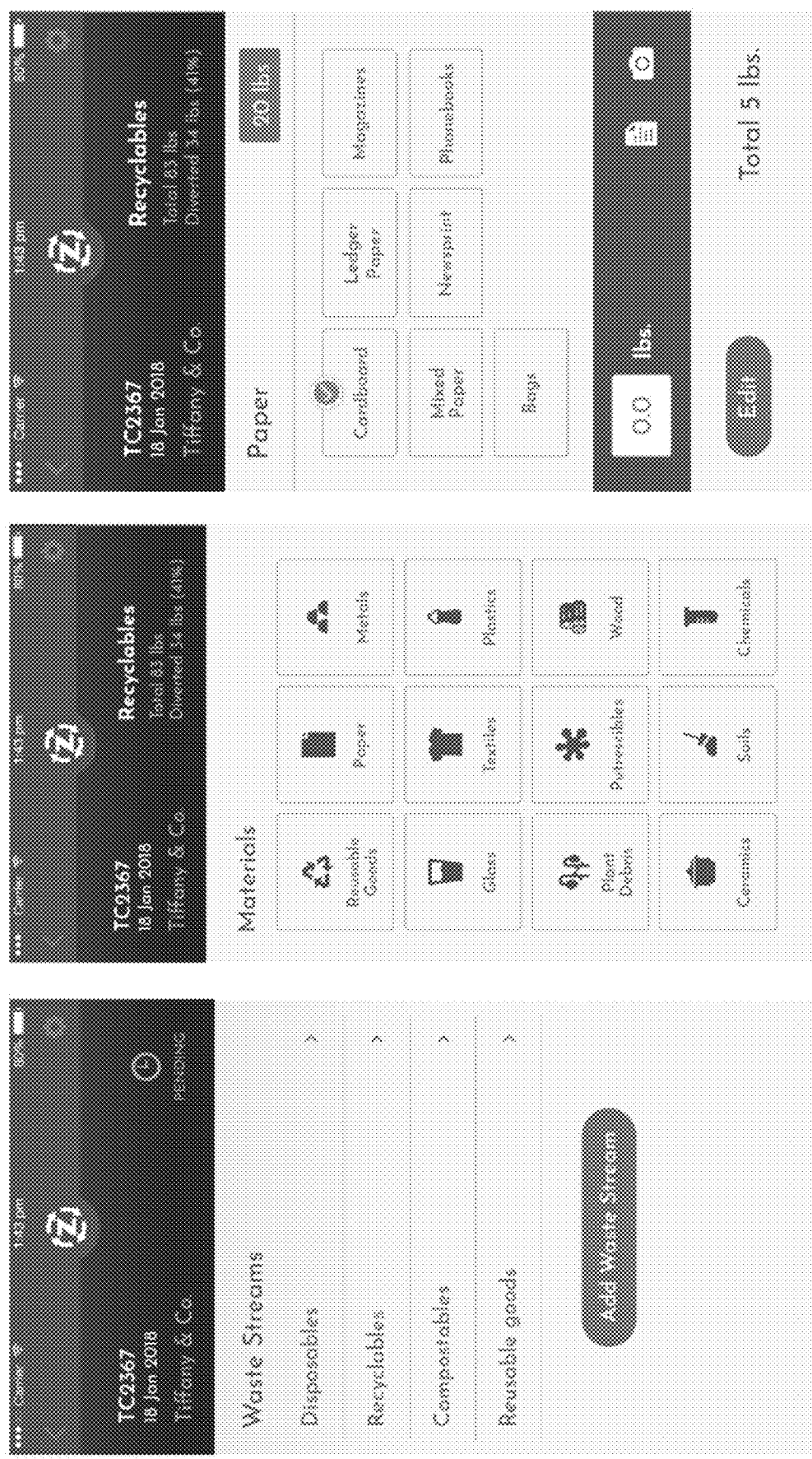
FIG. 9 presents exemplary screen images showing waste audit client software application functions associated with the categorization and quantification of waste.
Figure 10:
FIG. 10 presents exemplary screen images showing waste audit client software application functions associated with a dashboard of waste audit results.

FIGS. 8-10 present screen images from an exemplary waste audit client software application. FIG. 8 presents screen images showing software functions associated with the listing of prior audits, or the starting of a new audit. FIG. 9 presents screen images showing software functions associated with the categorization and quantification of waste. FIG. 10 presents screen images showing software functions associated with a dashboard of waste audit results.

An exemplary embodiment of the method includes the following steps. Each waste stream is sorted into corresponding buckets or bags for each "material" type (e.g., paper, plastic, glass, organics, cardboard, etc.) and further for each "item" type (e.g., magazines, office paper, food waste, plastic bottles, milk bottles, etc.) within the material categories. Each bag is placed individually on the scale. One or more buttons corresponding to each material and/or item type is pushed on a display that is communicably connected with the scale. The weight data of each bag is automatically associated with the material type and transmitted to a cloud database. The display is optionally used to enter additional details for each item type in the form of notes. Such details can include information regarding contamination, source within a facility, or any other observation. The notes are automatically transmitted to the cloud database. The display can optionally be used to take photos of individual bags/buckets. The images are associated with the item type and transmitted to cloud database. A completion button is selected and pressed once all data has been entered. Waste material categories and types for sorting can include, for example, non-recyclable/non-compostable waste, bathroom waste, compostable waste, recyclable paper, cardboard, metal, glass, plastic yard trimmings, e-waste, batteries and fluorescent lamps.

Figure 12:
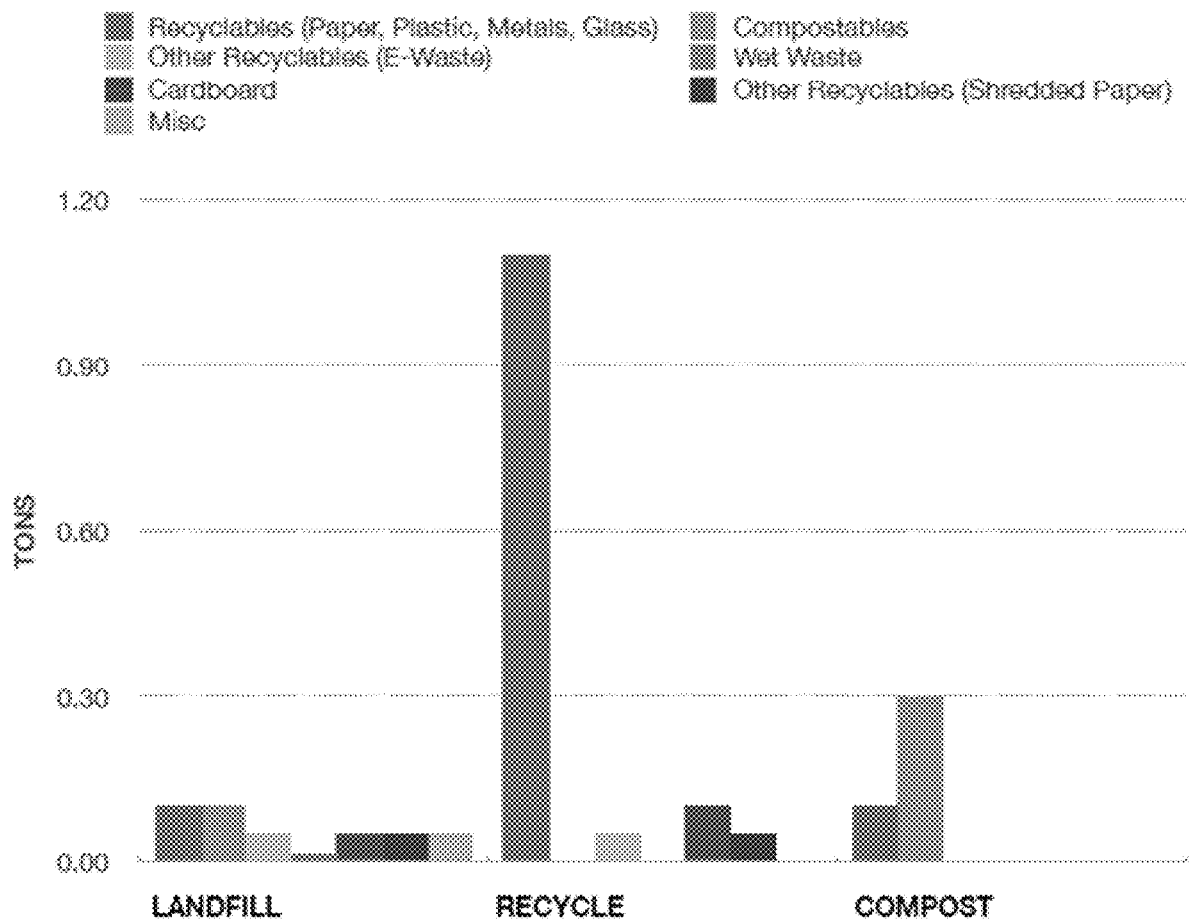
FIG. 12 presents graphs and tables from an exemplary waste audit report in accordance with an embodiment.

The collected data can be analyzed automatically by an algorithm that uses statistical techniques and models (e.g., the WARM environmental model of the Environmental Protection Agency) to compute metrics such as weights of all materials, comparisons of different waste streams, contaminants in each stream, top contaminants that can be diverted correctly, and net environmental impacts such as reduction in greenhouse gas emissions and equivalent energy savings. A copy of a report, a spreadsheet, and/or a dynamic dashboard with the data can be automatically emailed, shared, or otherwise delivered or transmitted to a client of the waste audit. Exemplary graphs and tables of a waste audit produced using the disclosed methods and systems are shown in FIGS. 11 and 12.

Waste audit software is also provided for smartphones, tablets, or other mobile or handheld computing devices. The platform is customizable and allows for fields to be created, edited, or deleted as needed for each individual waste management application. For example, one use-case might need to track the waste generated at a building by floor, suite, and tenant information, such as occupancy and/or square footage. In another use-case, it might be more important to track waste generated in containers stored in enclosures, along with the location of the enclosures and identification of staff servicing those enclosures. These use-cases and others can be programmed using the provided waste audit software platform so the users of the different use-cases only access the fields programmed for their needs.

Figure 13:
FIG. 13 presents exemplary screen images from a waste audit mobile software platform in accordance with an embodiment.
Figure 14:
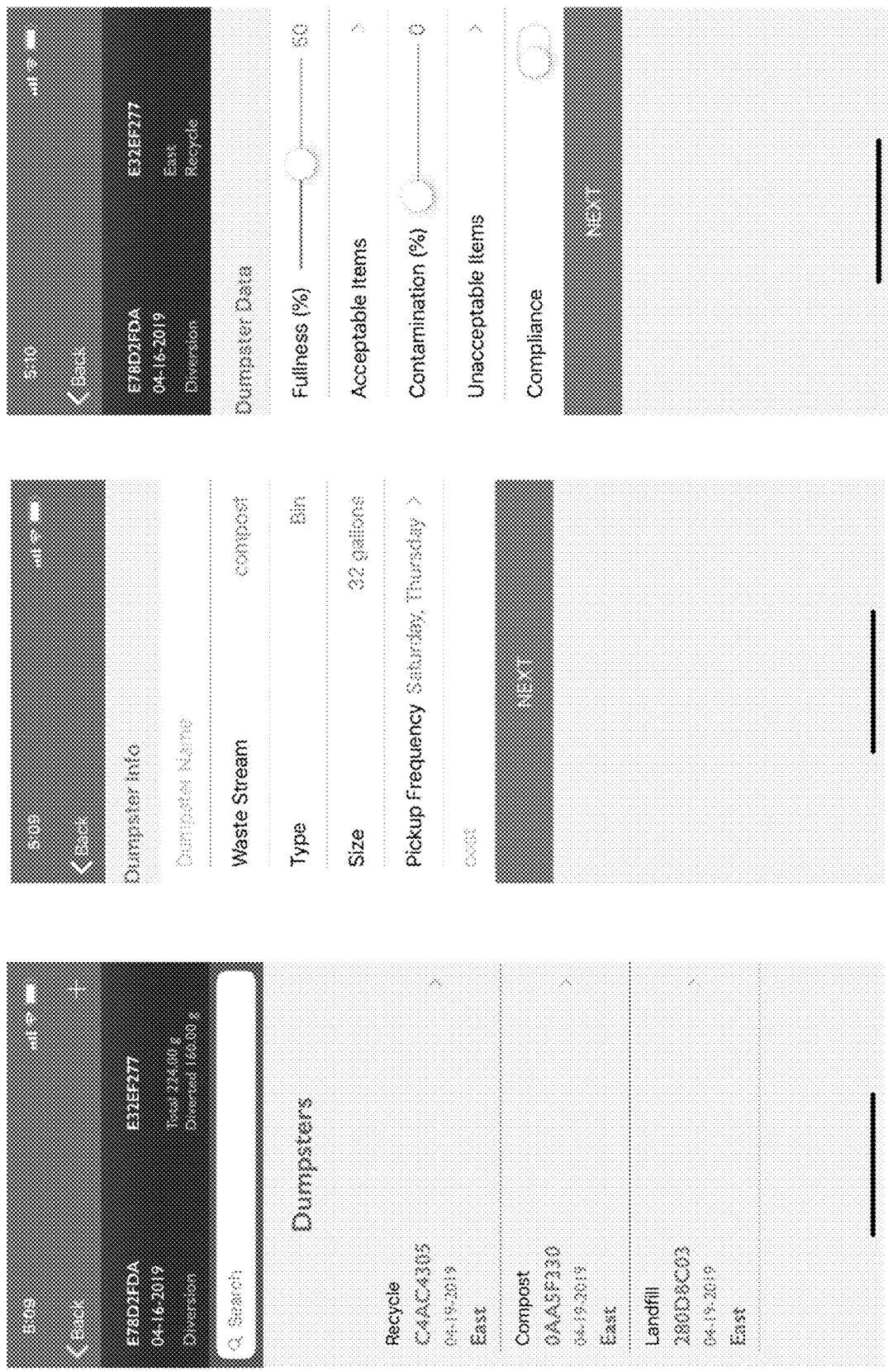
FIG. 14 presents screen images from a waste audit mobile software platform in accordance with an embodiment.

Using the data captured by a scale and/or by a mobile devices with any of the methods disclosed herein, a mobile platform can display, for example, data summaries, spreadsheets, or invoices (e.g., PDF invoices). These can be presented in the form of dashboards configured to display information in easily readable and interactive formats. Examples of dashboards created and displayed with the provided mobile platform include a waste analysis interactive dashboard, an invoice analysis interactive dashboard, a waste characterization PDF report, and a building dashboard. Exemplary screen images from a provided waste audit mobile software platform are presented in FIGS. 13 and 14.

In some embodiments, the waste auditing methods and systems use a method for measuring waste, wherein the waste measuring method includes providing a waste measuring system as described above, and a waste container. The waste container can be at least partially filled with a waste material, and the waste material can include any waste type, such as those described in more detail above. The method can include communicating to the waste measuring system a waste category corresponding to the waste type, thereby generating waste category data associated with the waste material. In certain aspects, the communicating includes speaking a voice prompt. In some embodiments, the sensing unit or the data collection unit includes a microphone configured to receive voice prompts. In certain aspects, the communicating includes touching a button or switch. In some embodiments, the button or switch is an element of the sensing unit. For example, the sensing unit can be a scale that includes two or more buttons, each of which corresponds with a different waste type category or subcategory. In some embodiments, the button or switch is a touchscreen button that is an element of the display unit or the data collection unit. For example, the data collection unit can be a mobile computing device that includes a touchscreen displaying two or more buttons, each of which corresponds with a different waste category or subcategory. In some embodiments, a user can edit the arrangement or function of buttons that are displayed on a touchscreen, such that the number or classification of waste categories or subcategories can be altered as desired. In some embodiments, the timing or pressure applied to the touching of the button or switch can also be used to communicate information regarding a waste type category or subcategory. For example, a sensing unit can include a button associated with a particular waste category, such as recyclable material, and different durations with which the button is pushed can select different waste subcategories, such as recyclable plastic, recyclable paper, or recyclable cardboard.

The waste measuring method can also include quantifying the weight of the waste container using the sensing unit according to any of the methods disclosed herein, thereby generating waste weight data associated with the waste material. In a preferred embodiment, the quantifying occurs in response to the communicating of the waste category or subcategory. In certain aspects, the touching of a button or switch, or the speaking of a voice prompt, both communicates a waste category to the waste measurement system, and causes the waste measurement system to perform the quantifying of the waste container weight. This provides an advantage over conventional waste auditing practices, in which the weighing of waste and the assigning of a waste category to the waste weight data occur separately from one another, with the separation possibly being on the order of hours, days, weeks, or longer. In contrast, with the provided waste measurement method, the generation of the waste category data and the related waste weight data can occur nearly simultaneously. This greatly simplifies and streamlines the waste measurement method, removing additional steps required of a waste collector or auditor, speeding the waste measurement and auditing process, and reducing the likelihood of missing or mismatched data.

The waste measuring method can also include transmitting the waste category data and the waste weight data to a data collection unit. In some embodiments, the data collection unit is a mobile or handheld device. In certain aspects, the data collection unit is a smartphone. In some embodiments, the data collection unit is a remote server. The data collection unit can be configured with software or other programmed instructions to record, store, analyze, and/or report the data once transmitted. In some embodiments, the method is repeated for at least a second waste container, material, type, or category, and the data collection unit receives transmitted data associated with two or more waste measurement samples or events. The waste measurement method can also include presenting the waste category data and waste data associated with one or more waste materials using the display unit. In some embodiments, the display unit is the sensing unit, as is the case, for example, in which a scale includes a monitor, lights, or other display. In some embodiments, the display unit is the data collection unit, as is the case, for example, in which a smartphone includes a screen. In certain aspect, the presenting of the waste category data and the waste weight data includes producing a report that includes such data. The report can, for example, use the data to calculate metrics related to waste generation, waste diversion, environmental impact, and areas for improvement.

Figure 15:
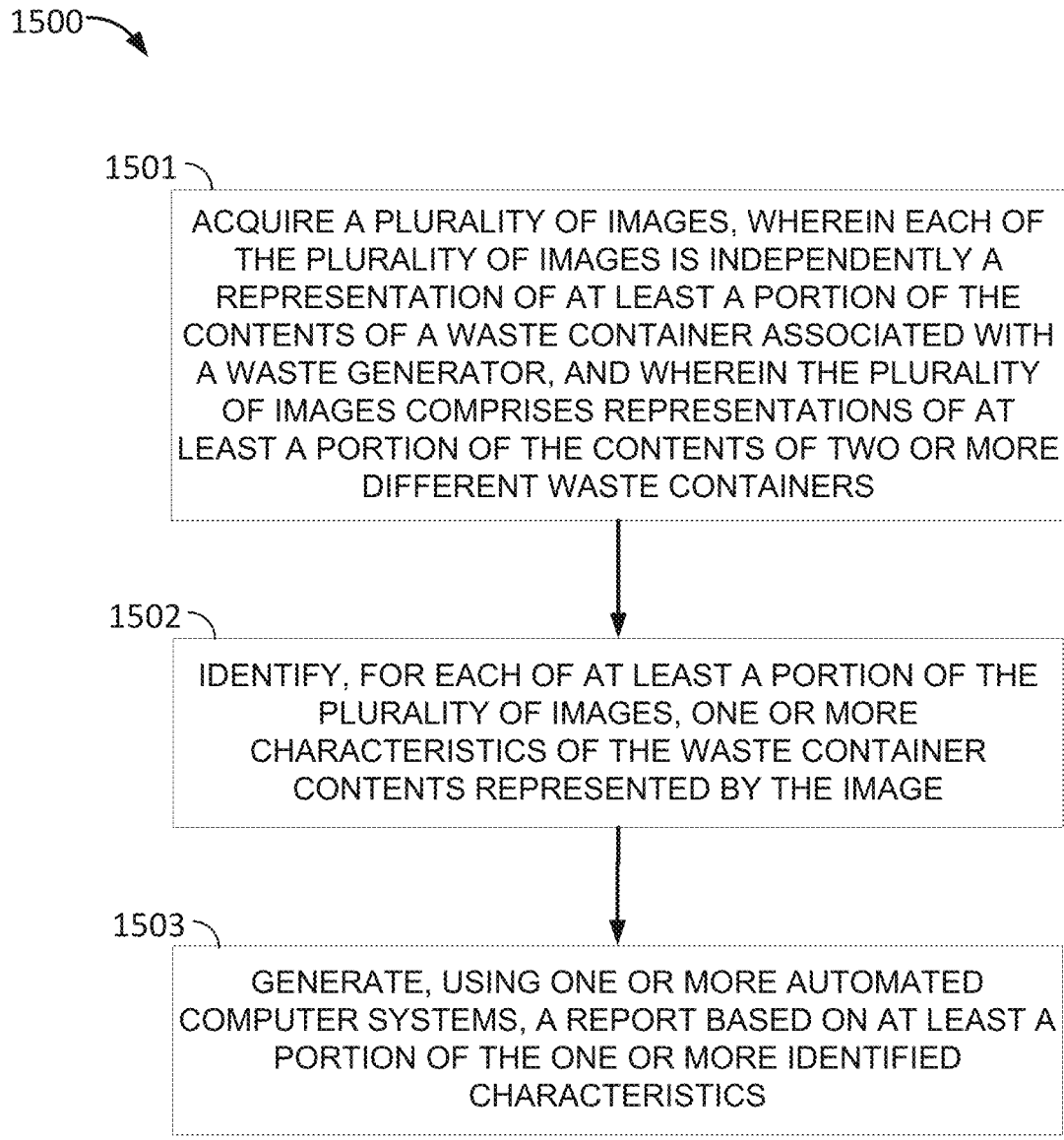
FIG. 15 is a flowchart of a method for evaluating waste in accordance with an embodiment.
Figure 16:
FIG. 16 is an image representing a portion of the contents of a waste container in accordance with an embodiment.

As discussed above, the methods disclosed herein take advantage of sensing units that in some embodiments can include cameras or other imaging devices. The flowchart of FIG. 15 illustrates a provided method 1500 of evaluating, monitoring, or auditing waste using a plurality of images acquired with such sensing units. In operation 1501 of the method, a plurality of images are acquired. Each of the images is a representation of at least a portion of the contents of a waste container. For example, the image can represent a view of the upper portion of the waste container contents, e.g., that portion of the contents that is visible when viewed through an opening of the container, and not including contents lying underneath, and obscured by, the visible contents. FIG. 16 provides an example of such an image. The plurality of images can be acquired using any combination of one or more imaging modalities including, but not limited to, visible light as in FIG. 16, infrared light, or X-ray.

Preferably, the plurality of images includes representations of the contents of multiple, e.g., 2 or more, different waste containers associated with a waste generator. The number of waste containers whose contents are represented by the images can be, for example, 5 or more, 10 or more, 20 or more, 50 or more, 100 or more, 200 or more, 500 or more, or 1000 or more. By including a greater number and percentage of the waste containers associated with a waste generator, a more thorough and complete evaluation of the generator's waste streams can be produced with the provided method. This can be particularly true if the waste containers represented by the plurality of images have diverse locations within a site of the waste generator, or across multiple such sites. For example, the waste containers can be located in different rooms, floors, or buildings of an individual site or multiple sites. In this way, differences in waste generation and disposal behaviors for separate locations be identified, observed, and analyzed. Additionally or alternatively, by averaging information obtained from images acquired at different locations, undesired impacts of outlier data can be reduced.

In some embodiments, the plurality of images includes images that have been acquired at different times. The plurality of images can include images having acquisition times separated by, for example, at least 12 hours, e.g., at least 1 day, at least 2 days, at least 3 days, at least 4 days, at least 5 days, at least 6 days, at least 1 week, at least 2 weeks, at least 3 weeks, or at least 1 month. In some embodiments, the images having acquisition times with such separation are images representing a view of contents within the same waste container. By including a greater number of image acquisition times, a more thorough and complete evaluation of the generator's waste streams can be produced using the provided method. For example, trends in waste generation and disposal over time can be identified, observed, and analyzed. Additionally or alternatively, by averaging information obtained from images acquired at different time points, undesired impacts of outlier data can be reduced. In these ways, the provided methods provide clear advantages not present with, for example, more conventional one-time waste audits.

Also contemplated are embodiments in which the plurality of images are each acquired in a relatively short time period. The images can each be acquired within a time period that is, for example, less than 1 hour, e.g., less than 50 minutes, less than 40 minutes, less than 30 minutes, less than 20 minutes, less than 10 minutes, less than 5 minutes, less than 2 minutes, less than 1 minute, less than 30 seconds, less than 10 seconds, less than 5 seconds, or less than 1 second.

In operation 1502 of method 1500 of FIG. 15, one or more characteristics of the waste container contents represented by at least a portion of the plurality of images acquired in operation 1501 are identified. In some embodiments, the identifying of the waste container characteristics includes accepting and recording user input that is descriptive of the portion of the plurality of images. The user input can be entered by, for example, touching a button or switch or screen, speaking a voice prompt, or typing text. The one or more characteristics identified through user input can include, for example, an estimated fullness of a waste container. The one or more characteristics through user input can include a categorization of one or more waste material types present in the waster container contents. The one or more characteristics identified through user input can include a presence or absence of a contaminant in the waste container contents.

In some embodiments, the identifying of the waste container contents includes applying artificial intelligence and computer vision using one or more automated computer systems. The computer systems used for the identifying of the characteristics can be the same as the computer systems used for the acquiring of the images, or can be different. In some embodiments, both user input and artificial intelligence are used to identify waste container content characteristics. The one or more characteristics identified with artificial intelligence can include, for example, an estimated fullness of a waste container. The one or more characteristics identified with artificial intelligence can include a categorization of one or more waste material types present in the waster container contents. The one or more characteristics identified with artificial intelligence can include a presence or absence of a contaminant in the waste container contents.

Other characteristics identified manually and/or with artificial intelligence can include, for example and without limitation, waste stream categorization, waste item count, waste item fullness, waste container location, and other operational and environmental conditions.

Figure 17:
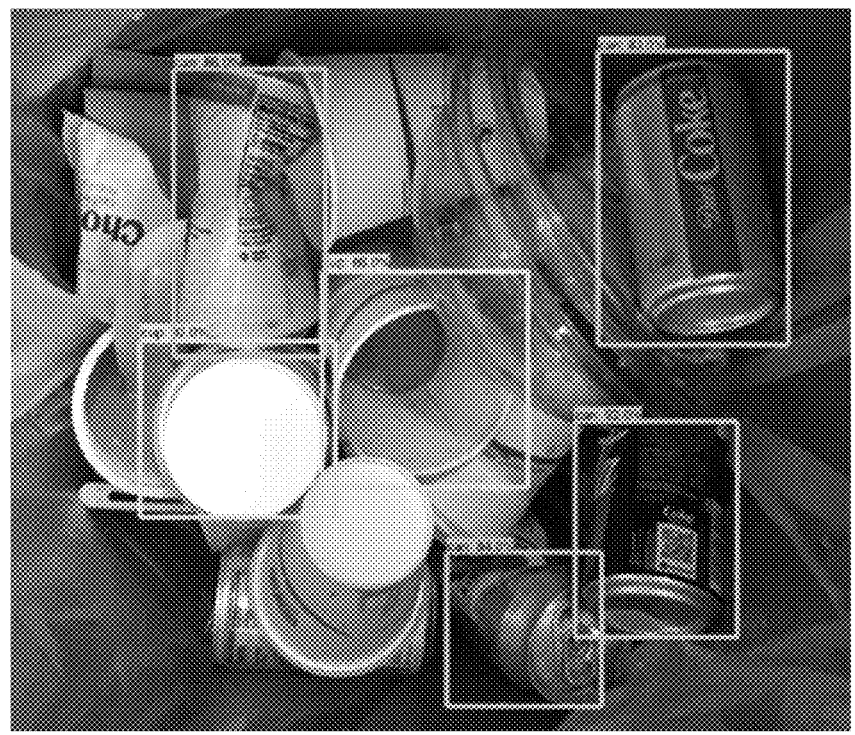
FIG. 17 is an example of the application of artificial intelligence and computer vision to identify characteristics of the waste container contents represented by the image of FIG. 16.

The computer vision techniques used to identify waste container content characteristics can include, for example, object classification protocols, object localization protocols, object detection protocols, and/or object segmentation protocols. These protocols can rely on, for example, classification models based on support vector machines, convolutional neural networks, and deep learning. FIG. 17 provides an example of computer vision techniques such as object detection, localization, segmentation, and classification protocols applied to the image of FIG. 16.

In operation 1503 of method 1500 of FIG. 15, a report is generated using one or more automated computer systems. The report is based on at least a portion of the one or more characteristics identified in operation 1502. In some embodiments, the generating of the report includes deriving estimated aggregated properties for the waste containers of the waste generator. These aggregated properties can include, for example, waste container fullness, waste item identification, waste stream categorization, waste item count, or contamination presence data that has been averaged across all waste containers of the waste generator or across a selected subset of these waste containers. Such aggregated properties can be particularly useful in producing holistic reports with overall trends and findings. In some embodiments, the report includes characteristics of an individual waste container of the waste generator. Such individualized reports can be particularly useful in producing notifications of events such as overflow or maintenance needs requiring individualized attention.

In some embodiments, the generating of the report includes formulating a recommendation for one or more improvements to future waste management practices by the waste generator. The recommendations can include proposed steps to, for example, reduce waste volume or mass. The recommendations can include proposed steps to reduce waste contamination. The recommendations can include proposed steps to increase landfill recovery.

In some embodiments, the provided method further includes communicating the report generated in operation 1503 of method 1500 of FIG. 15. The communicating can be performed using one or more automated computer systems, e.g., the one or more computer systems used for the acquiring of the images, the identifying of the waste container content characteristics, and/or the generating of the report. The report can be communicated according to a regular and predetermined schedule. The report can be communicated on an as-needed basis when predefined trigger events are detected or identified. The communication can have the form of, for example, a real-time summary on the status of one or more devices, a text or email notification, a real-time analytics dashboard, or another machine like a bin or compactor. The communication can be viewable by a client device, and can be accessed through a cloud database.

The communication can be, for example, a notification to one or more individuals, machines, databases, or business entities. In some embodiments, the communication includes a notification of an overflow or other operational or environmental condition, and is sent to one or more parties internal or external to the monitored organization for performing remediation steps. In some embodiments, the communication includes a notification of an overflow or excess volume or mass condition, and is sent to one or more parties internal or external to the monitored organization for performing steps to divert the overflow or excess waste materials. For example, a generator of food and food waste can use the provided systems to notify organizations that excess food is available to be picked up. The same general paradigm can be applied to, e.g., construction waste and others where materials that could end up in a waste stream can instead be diverted for alternate purposes.

The provided methods can be implemented using systems and units, e.g., a sensing unit, data collection unit, and/or display unit, that can each independently include one or more computer systems. Any of the computer systems can utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

Subsystems of a computer system can be interconnected via a system bus. Additional subsystems such as a printer, keyboard, storage device(s), monitor, display adapter, and others can also be included in a computer system. Peripherals and input/output (I/O) devices, which couple to an I/O controller, can be connected to the computer system by any number of means known in the art such as an input/output (I/O) port (e.g., USB, FireWire®). For example, an I/O port or external interface (e.g. Ethernet, Wi-Fi, etc.) can be used to connect a computer system to a wide area network such as the Internet, a mouse input device, or a scanner. The interconnection via a system bus can allow the central processor to communicate with each subsystem and to control the execution of a plurality of instructions from a system memory or the storage device(s) (e.g., a fixed disk, such as a hard drive, or optical disk), as well as the exchange of information between subsystems. The system memory and/or the storage device(s) can embody a computer readable medium. The subsystems can also include one or more sensors, such as a camera, microphone, accelerometer, and the like. Any of the data mentioned herein can be output from one component to another component and can be output to the user.

A computer system can include a plurality of the same components or subsystems, e.g., connected together by external interface, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs can also be encoded and transmitted using carrier signals adapted for transmission via wired, optical, and/or wireless networks conforming to a variety of protocols, including the Internet. As such, a computer readable medium can be created using a data signal encoded with such programs. Computer readable media encoded with the program code can be packaged with a compatible device or provided separately from other devices (e.g., via Internet download). Any such computer readable medium can reside on or within a single computer product (e.g. a hard drive, a CD, or an entire computer system), and can be present on or within different computer products within a system or network. A computer system can include a monitor, printer, or other suitable display for providing any of the results mentioned herein to a user.

VI. Examples

Example 1. University Waste Monitoring

A large university client was already a sustainability leader in the education and health sectors, having won multiple awards. The university client occupied 80 buildings on 3 campuses, with a daily occupancy of approximately 22,700 people distributed among 5 million square feet. The university client had set goals of achieving carbon neutrality by 2025 and zero waste by 2020. A six-month pilot program deployed devices, systems, and methods as described herein to ten buildings owned and operated by the university client. The pilot's purpose was to gain visibility into waste streams as well as generation and disposal patterns per building, leverage data gathered to create effective programs to inform occupants, and track overall progress to zero waste. For the pilot, the university client sought a return on investment (ROI) within 1 fiscal year. The university client's zero waste goal is to reach a 90% diversion rate by 2020. A recent waste audit revealed that 80-90% of the trash volume on the university client's campuses could have been recycled or composted.

The university client's facilities team experienced several waste management issues that were consuming staff hours, adding extra costs and limiting their ability to tackle contamination or increase diversion rates. These issues were largely caused by the inadequate waste stream and operations data. As a large institution with multiple buildings, the university client had difficulty tracking their waste stream and aggregating data across their portfolio. With many building sizes and types, determining appropriate service levels was a challenge. This led to either under or oversizing service levels, with negative consequences arising in both cases. When service levels were oversized, the university client would pay up to 30% more for unnecessary pickups. When service levels were undersized, the university client would be fined for contamination, extra pick-ups and blockages. Without measurement data, the supervisors didn't know what they were actually paying for.

Hauler invoices provided one source of waste data available to the university client, but offered incomplete and non-standardized details that were hard to aggregate, since each hauler has their own billing cycle and invoice format. Additionally, supervisors were losing up to 10 hours per month inputting and analyzing their invoices. Likewise, without being able to see specific generation and contamination data, facility managers were left blind to persistent problems and limited to taking broad, imprecise actions.

Another source of data was available in waste audits, which were carried out using pen and paper to record data in the field, and later transcribed into a spreadsheet. This approach is error-prone and time-intensive, and fails to provide actionable insights via spreadsheet. It took staff 66 hours per month in administrative work translating handwritten data into spreadsheet. Furthermore, the data organization did not lend itself to downstream analytics in waste levels and contamination items across time, location or seasonality. These drawbacks effectively negated the ability for managers to make timely adjustments, identify persistent problems, or track progress towards goals. It took 3 hours per supervisor per month to analyze this information.

Missed pick-ups by the waste hauler were another issue vexing the university client's staff, occurring 3-4 times per week per building across all streams on average. This created overflowing dumpsters, as well as rodent and odor issues, leading staff to consolidate the waste with that of other buildings. Staff were spending 11 hours per month to fix the situation by hand, while supervisors lost one hour per month getting the waste hauler to return, which would take at least a full day.

Equipped with the disclosed methods, systems, and devices, the university client gained accurate data collection, transparency into their waste stream, and precise contextual analytics in real-time to inform their actions. Using a provided mobile software application, staff was enabled to tap, swipe, and easily document circumstances on the ground during their inspections, with the information then immediately uploaded to the cloud and visible for supervisors to access in real-time. The software application was used for two primary purposes: (1) To monitor contamination from occupants or janitorial operations, staff would open every other bag coming into the loading dock and acquire an image, tag fullness and contamination levels with a swipe, and enter information relating to the presence of acceptable or unacceptable materials with a single tap. (2) To monitor carts, roll-offs, and compactors that would be picked up by the hauler, staff would acquire images of the containers, tag fullness and contamination levels, and enter information relating to items that were incorrectly disposed of.

With reliable invoice analysis and measurements of quantities of waste being generated by each building, managers were able to appropriately match service levels to each building, thereby decreasing costs and headaches. If staff found illegal dumping; an overflowing dumpster; hazardous materials, glass, or electronic waste in a bin; or a missing pickup, facility managers received an email instantly to correct the problem. This created a rapid response mechanism to head off costly fines and avoid having to dedicate hours of staff labor to redistribute material from overflowing bins. Additionally, each month the provided platform automatically aggregated and analyzed the Client's invoices across their portfolio of buildings, comparing costs, services levels and diversion metrics, and highlighting the best and worst performers.

Figure 18:
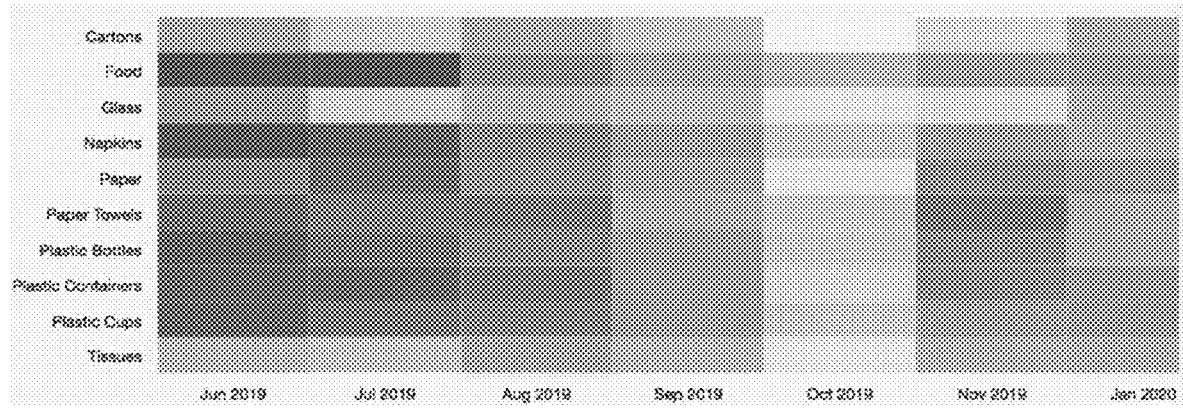
FIG. 18 is a heat map showing variations in landfill contamination produced within one building of a university over a 7-month time period

During the pilot, each user tagged more than 1000 items across landfill, recycle, and compost streams, with their estimated contribution to contamination paving the way for granular insights. These insights were then utilized to inform specific, targeted actions to fix problems, decrease contamination and boost diversion rates. FIG. 18 presents a reported heat map visualization of the assessed temporal variation in landfill contamination produced within one building of the university client over a 7-month time period.

Figure 19:
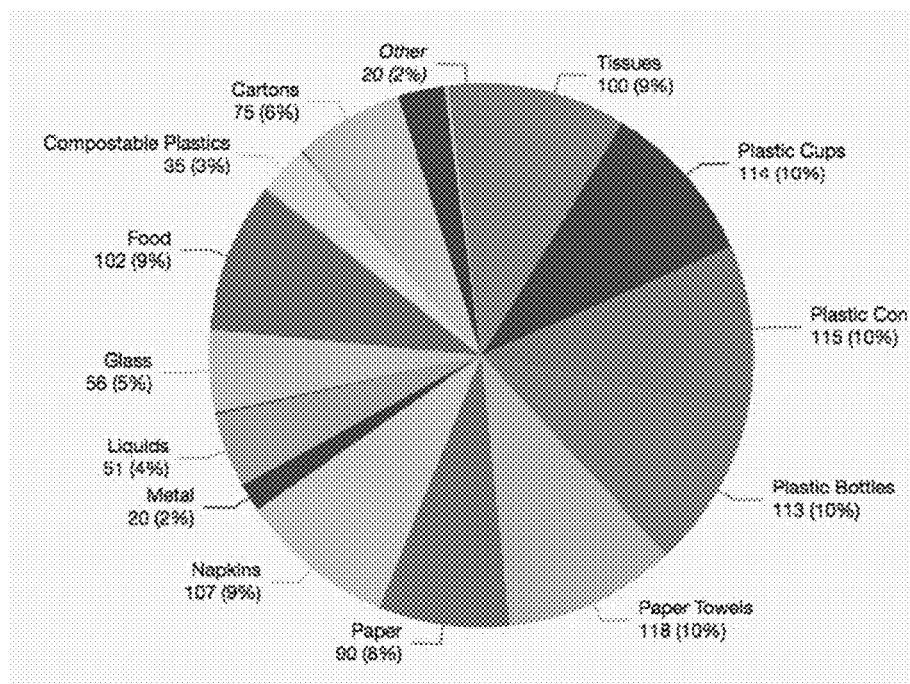
FIG. 19 is a pie chart showing the most commonly seen waste material types produced in a single month within one building of a university.

Additionally, using a simple drag and drop feature in the provided web platform, the university client was able to display specific waste data for a building onto a nearby screen visible to passers-by. FIG. 19 presents an example of such a display, with a pie chart visualizing information about the most commonly seen waste material types produced in a single month within one building. The precision and relevance of the data created engaging, educational content that offered viewers tangible steps to reduce contamination issues in that building.

The methods, systems, and devices disclosed herein thus enabled the facility and recycling team to regularly monitor waste generation, diversion, contamination and operational issues, identify areas for improvement, tackle problems right away, and improve overall process efficiency. Since the university client was already a leader in pursuing zero waste, many buildings already had very high diversion rates, typically around 90%. Going any higher was a challenge, since certain items like lab waste could only be landfilled. In spite of that, the buildings in the pilot increased their diversion to 93%, essentially hitting the maximum diversion possible. While half of the buildings in the pilot had personnel to sort for contamination and the other 5 buildings did not, these groups reduced their waste tonnage by 11% and 13%, respectively.

A greater issue for the Client was with contamination. A common goal for zero waste is to lower contamination rates below 10%. Using the provided methods, systems, and devices, the university client found that the contamination of waste entering its loading docks was between 40% and 85%. During the pilot, buildings with sorters were able to see their contamination reduced to under 5% and those without sorters to less than 15%.

Using the reported data, the university client renegotiated their contract with the waste hauler to limit the number of missed pickups to a 2 per week maximum, versus 3-4 per week previously. Transparency into special cases allowed recycling staff to track persistent problems and contact custodial, facility and Environmental Health & Safety stakeholders who dealt with the offending party.

Efficiency gains from the provided methods, systems, and devices therefore paid off: instead of spending logging waste audits on paper and then transcribing them to spreadsheets, dealing with missed pickups, special contamination cases and analyzing invoices, the university client gained 77 staff and 8 supervisor hours per month for other tasks. This savings in time translated to the university client realizing an ROI within 6 months. With these techniques and devices, the university client established a model for a new paradigm of tracking waste generation, preventing and rapidly handling disruptive problems, harnessing data to inform targeted actions and overall developing a process to gradually move the organization closer and closer to its zero waste goal.

Example 2. Corporation Waste Monitoring

A large technology company was paying steep fines for waste contamination and unnecessarily high hauling costs, due to changing municipal zero waste regulations, inadequate data, and insufficient insights. The corporate client occupied 6 buildings, with a daily occupancy of 4500 people distributed among 3 million square feet. The corporate client's goal was to cut their costs, while reducing waste generation and increasing diversion from landfill. To assist with these goals, the corporate client participated in a six month project, deploying the devices, systems, and methods disclosed herein across the buildings that it owned or operated. With the project, the corporate client sought to gain visibility into waste streams as well as generation and disposal patterns for each building, reduce hauling costs and fines from contamination, track overall progress to zero waste, and leverage data gathered to create effective programs to inform facility managers, sustainability officers, janitorial staff, and occupants. The corporate client also sought a return on investment (ROI) within 6 months.

The corporate client had multiple waste management issues that were adding excessive costs, consuming staff hours and diverting resources from zero waste initiatives. These issues were caused primarily by inadequate waste stream and operations data, as well as a lack of insights. As a large company with multiple commercial buildings managed by different property management firms, the corporate client had difficulty tracking their waste streams and aggregating this data across their building portfolio.

For example, the corporate client's waste management costs had recently doubled due to fines for high levels of contamination. Once a local zero waste regulation took effect, the client had to hire full-time sorters at an additional cost of $80,000 annually. Even these measures did not resolve the fines. Incorrect waste disposal was responsible for significant contamination in the corporate client's recycling and composting stream. Plastic to-go containers with leftover food were a primary culprit, along with recyclable plastics in the compost bin or compostable plastics in the recycle and landfill bins. Without bin-level data from each floor, the corporate client couldn't pinpoint the source of contamination. All this contamination was costly: heavy fines were incurred for the wrong items in recycling and composting bins, and discounted recycling loads were being treated as landfill-bound by the hauler. This meant $30,000 per month in added costs for extra landfill volume and a reduced discount for waste diversion, causing hauler fees to go up. Lastly, contaminated bins had to be sorted, a time-intensive process that required specialized labor charging $80,000 annually.

Without localized bin-level visibility into waste generation and contamination, the corporate client's staff were blind to persistent problems, and limited to taking broad, imprecise actions. The only source of data was from a waste audit on a small sample size (10% of daily volume) conducted over a year ago. This did not capture the true and changing nature of the waste stream. The spreadsheet approach also failed to provide actionable insights. It took a full month before a report from the audit was completed and shared. As a result, the team was burdened with spreadsheets and reports to dig through and attempt to pull analysis from. This process offered questionable insights and was time-intensive, consuming 12 hours per month of staff labor. The data available to the corporate client didn't provide analytics for waste levels and contamination items across time, location or seasonality. This made it impossible for managers to identify specific problems, create campaigns to test solutions and track results to find the best approach. Without the capacity for analytics to inform them, the corporate client's zero waste initiatives were a shot in the dark. For example, was the increase in waste generation volume due to a non-optimized educational campaign on single use plastics or an uptick in take-out meals during lunch time?

Without the ability to regularly and accurately track the progress of zero waste initiatives, the corporate client's staff could not determine the success of their initiatives. A cumulative 80 hours were spent each month with various initiatives on education and training on proper waste sorting and local regulations without definitive results. This meant the corporate client couldn't truly evaluate if these initiatives actually made an impact. Furthermore, there were no milestones to guide their efforts.

Equipped with the methods, systems, and devices disclosed herein, the corporate client gained fast and accurate data collection, transparency into their waste stream, and precise contextual analytics in real-time to inform their actions. The provided mobile software application enabled staff to easily document bin conditions during their inspections. The data was immediately uploaded to the cloud where metrics and insights were aggregated in real-time using the provided algorithms. Supervisors were instantly able to access all this information on the provided web dashboard. The software application was used for two primary purposes. First, to monitor contamination from occupants or janitorial operations, the staff first took bin inventory by creating receptacles in every floor in the building. Then, every time they wanted to gather data, they acquired an image, tagged fullness and contamination levels with a swipe, and entered information about unacceptable materials with a single tap. Second, to monitor carts, roll-offs and compactors picked up by the hauler, staff would acquire images of the containers and tag fullness, contamination levels, and incorrectly discarded items.

Unlike manual auditing, the software application provided a report and analytics in real-time, as soon as the audit was completed by staff on the ground. If staff found food waste, hazardous materials, or electronic waste in a bin; or poor or outdated signage on a bin, an instant email notification was sent to facility managers to remediate the problem immediately. This created a rapid response mechanism to head off fines and save staff from spending hours redistributing material from overflowing bins. Two types of notifications were utilized: (1) event-based triggers when certain instances occurred, such as bad signage, heavy contamination, or a damaged bin; and (2) category-specific triggers when contaminant materials, such as food waste, electronic waste and hazardous waste were found. Either of these notification schemes could be programmed by the user to suit their situation.

Figure 20:
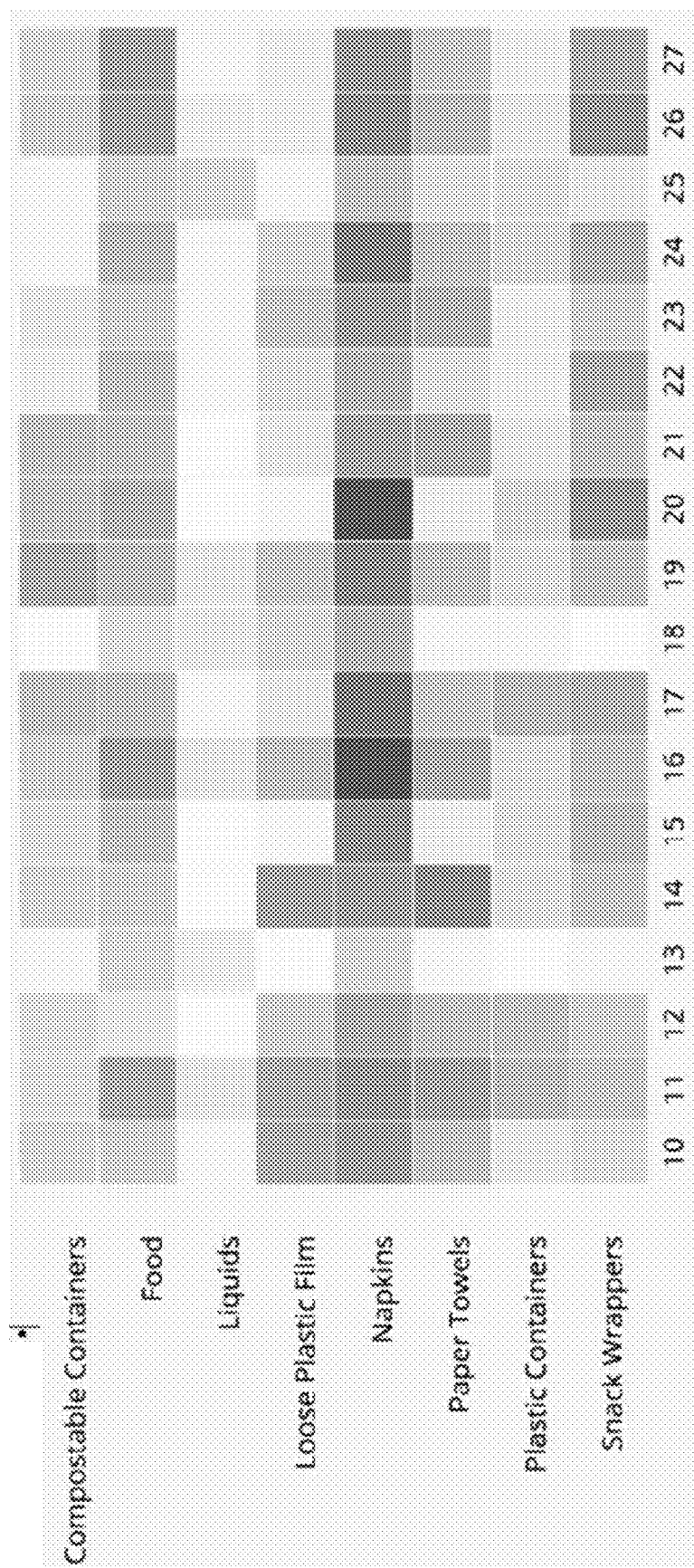
FIG. 20 is a heat map showing the distribution of waste stream material types by frequency across different floors of a building operated by a corporation.
Figure 21:
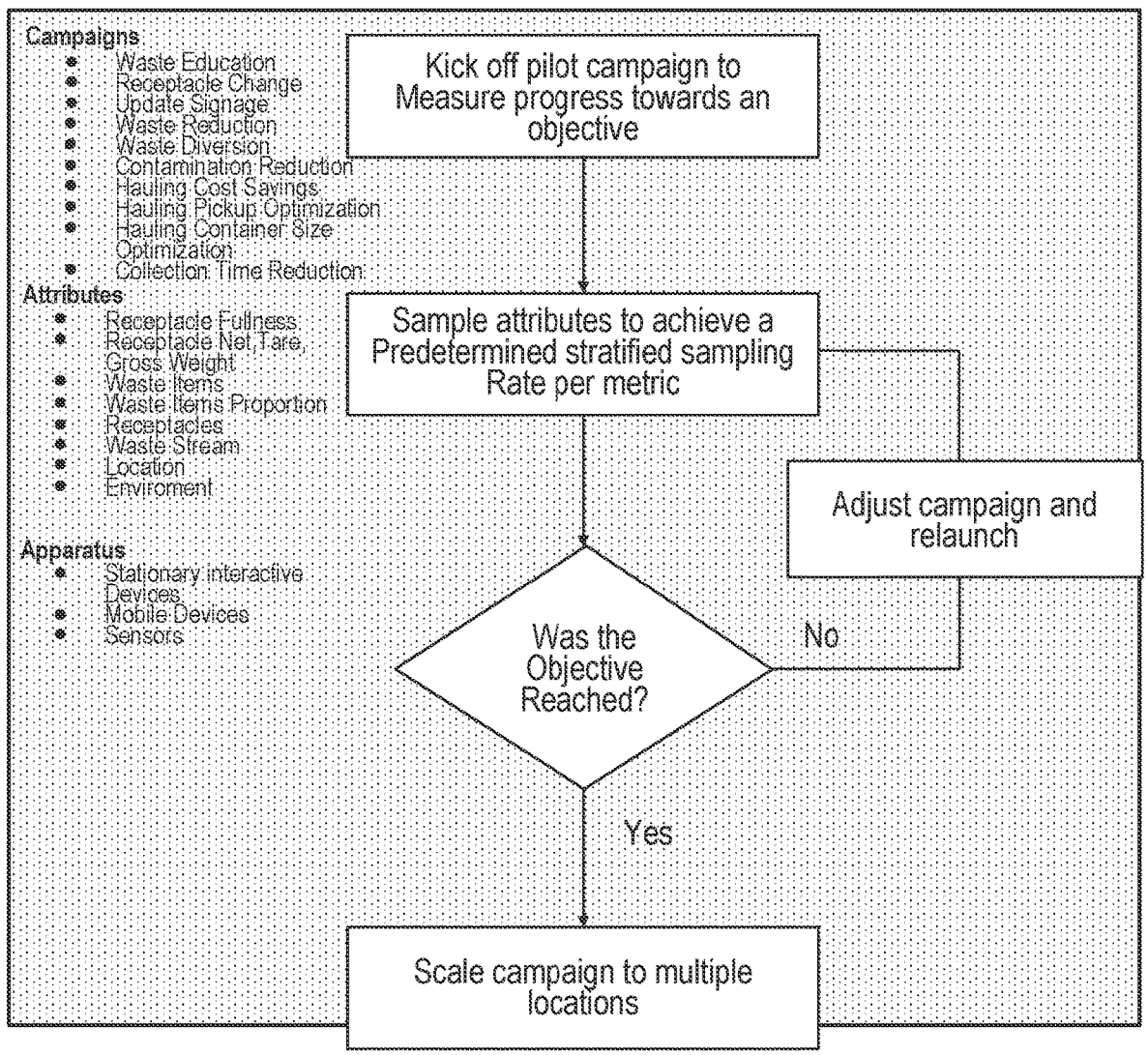
FIG. 21 is a flowchart of a closed-loop feedback system of sampling measurements associated with a campaign to alter the nature of waste generation and disposal in an organization.
Figure 22:
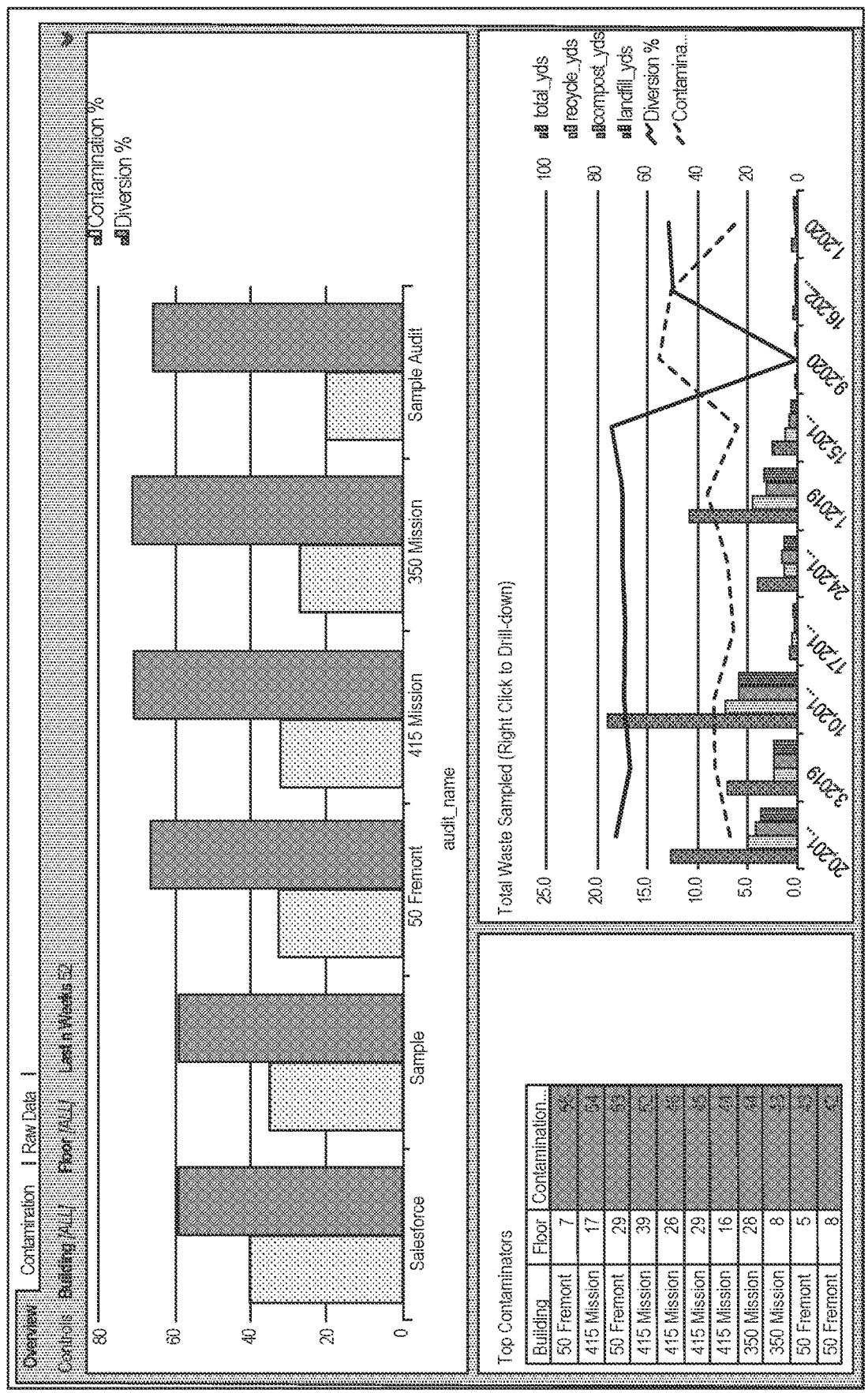
FIG. 22 is a screen image from an exemplary dashboard showing aggregated properties comprising characteristics of a waste generator's campaigns over time.
Figure 23:
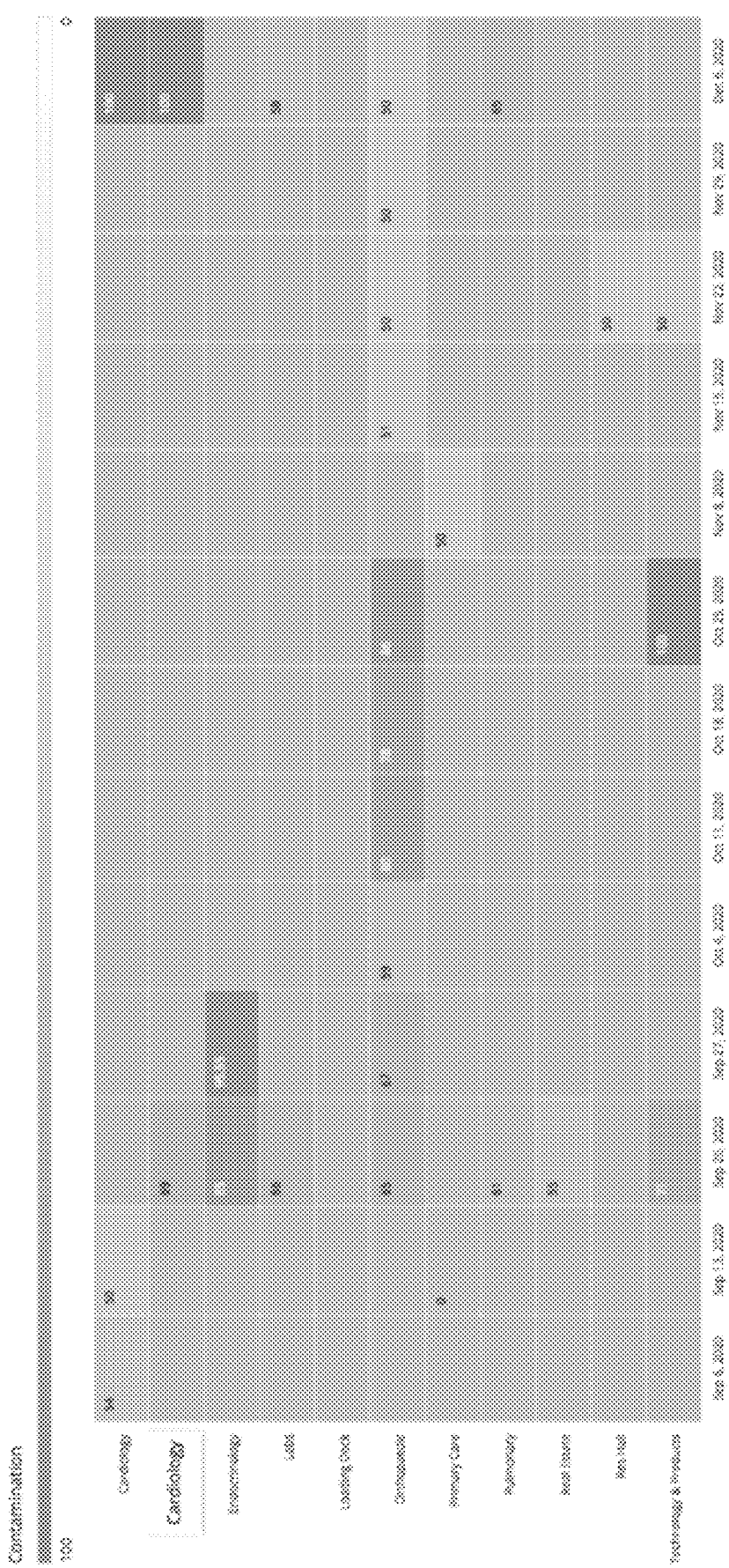
FIG. 23 is a heat map showing the frequency of contamination observed across various departments in a hospital.
Figure 24:
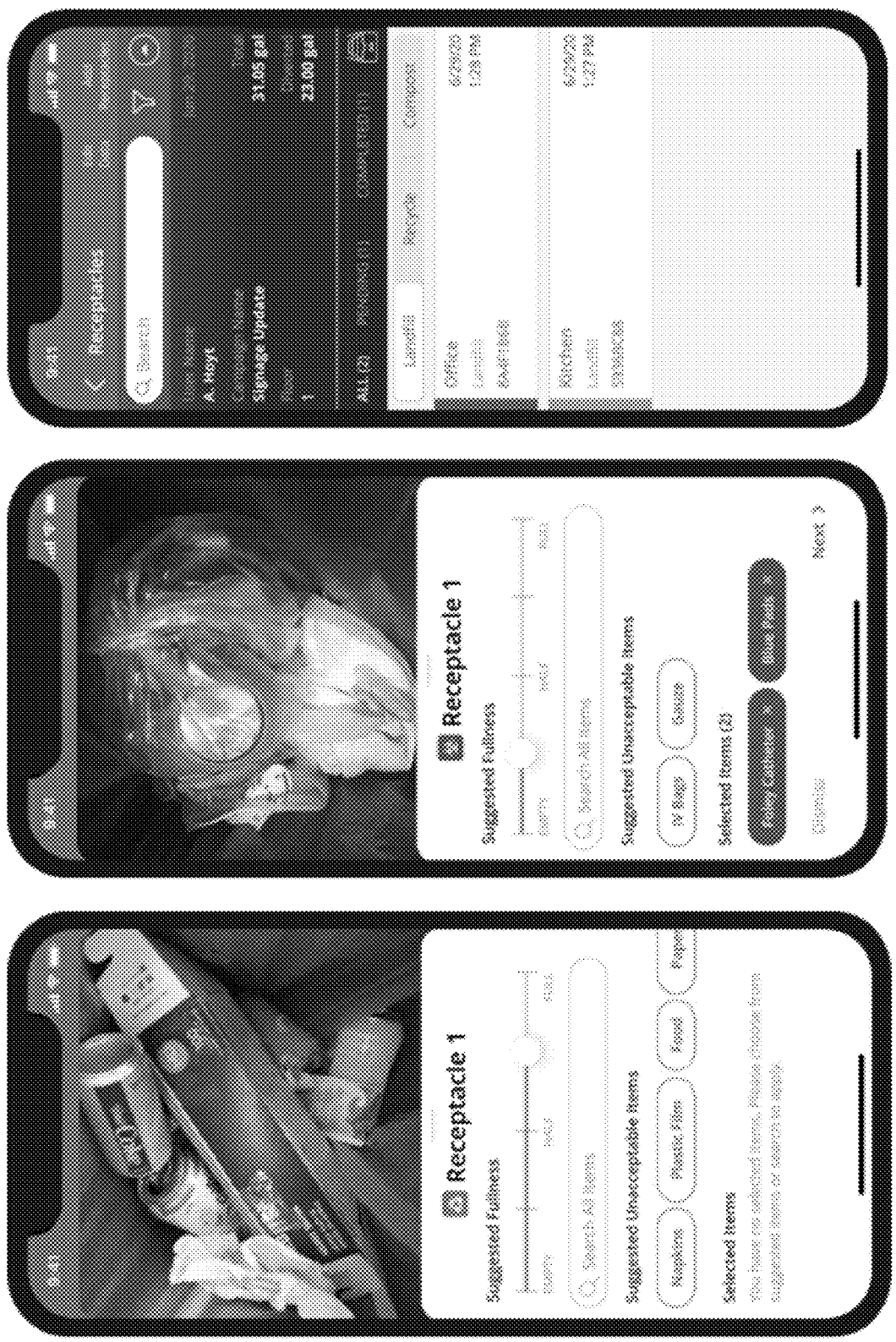
FIG. 24 presents exemplary screen images showing waste audit client software application functions associated with (left) waste characterization of municipal solid waste at office building, (center) waste characterization of biohazard waste at a hospital, and (right) an inventory of receptacles in a building.
Figure 25:
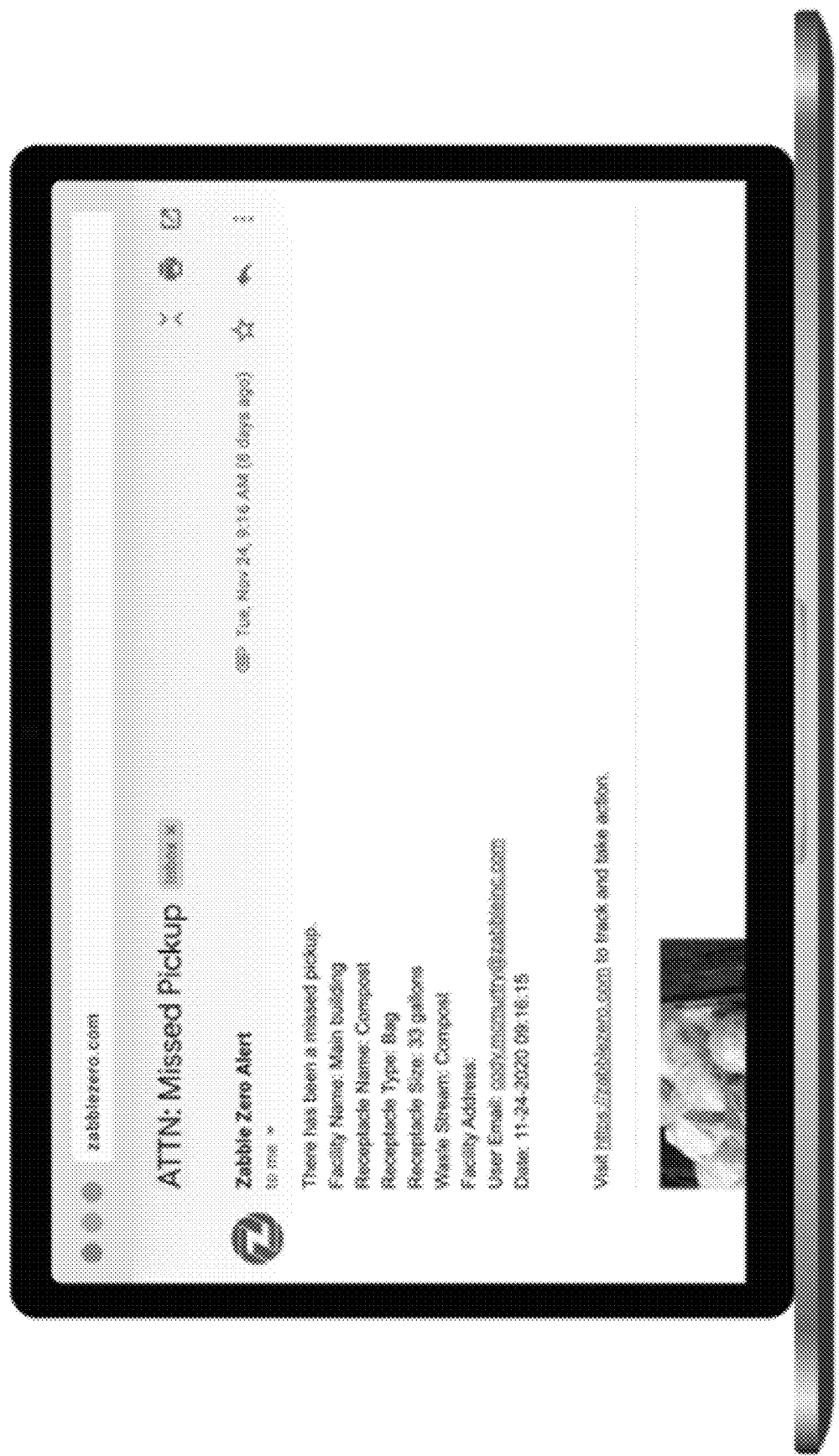
FIG. 25 is an example of a notification sent via email to alert personnel of a missed pickup event.
Figure 26:
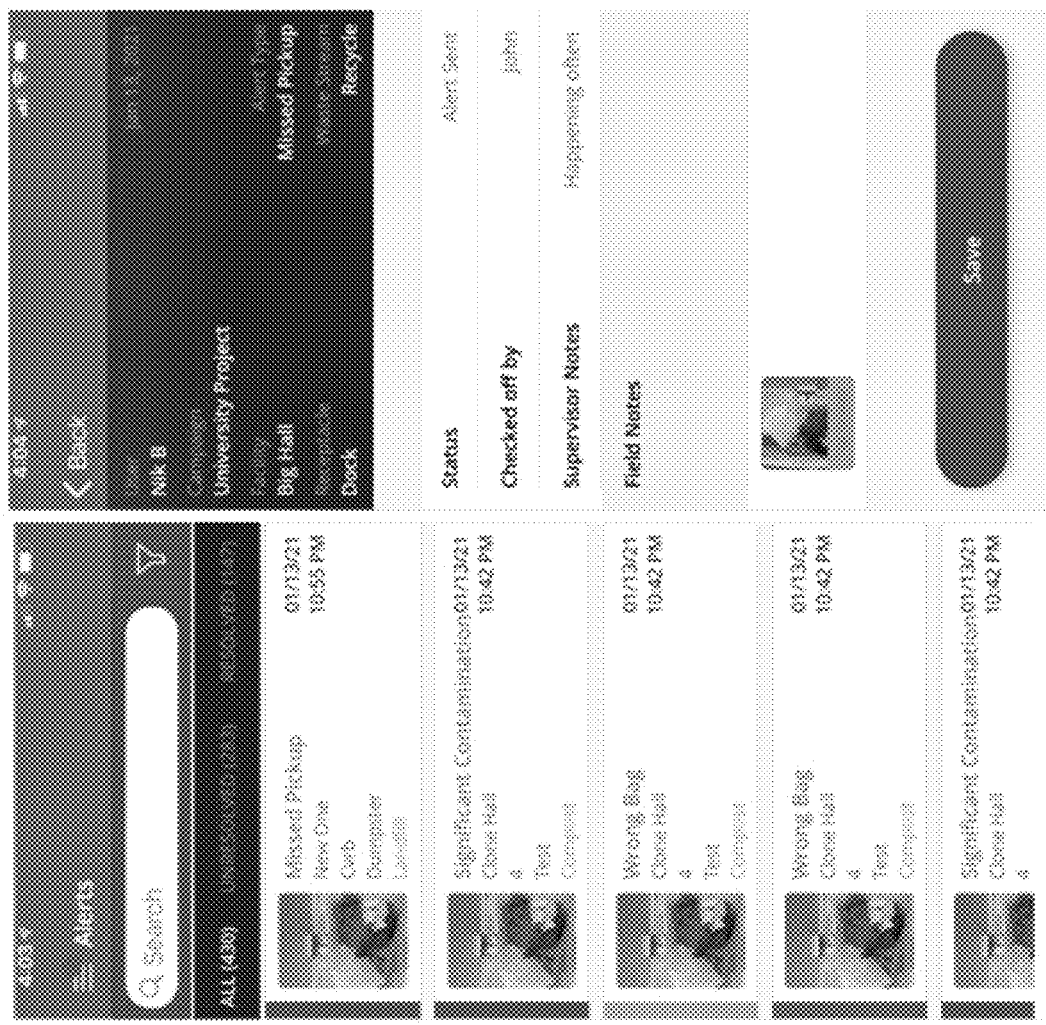
FIG. 26 presents exemplary screen images showing waste audit client software application functions associated with (left) alert notifications of contamination and operational events, and (right) the tracking of progress of alerts for contamination and operational events.
Figure 27:
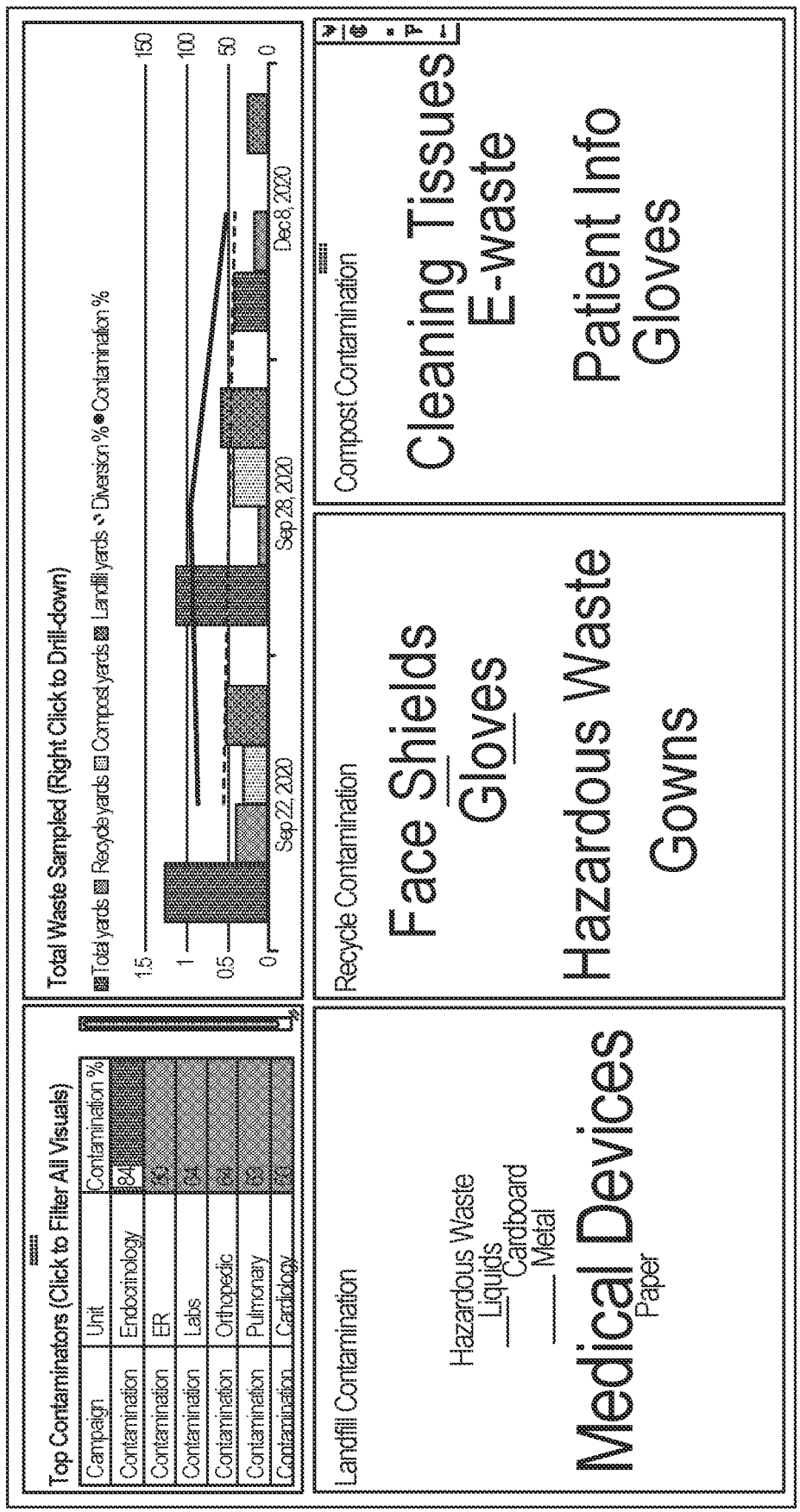
FIG. 27 is a screen image from an exemplary dashboard showing total volume of waste sample, contamination items in each type of waste stream, and their locations inside the building.
Figure 28:
FIG. 28 is a screen image from an exemplary dashboard showing contamination and diversion percentages of sampled waste is each department of a hospital.
Figure 29:
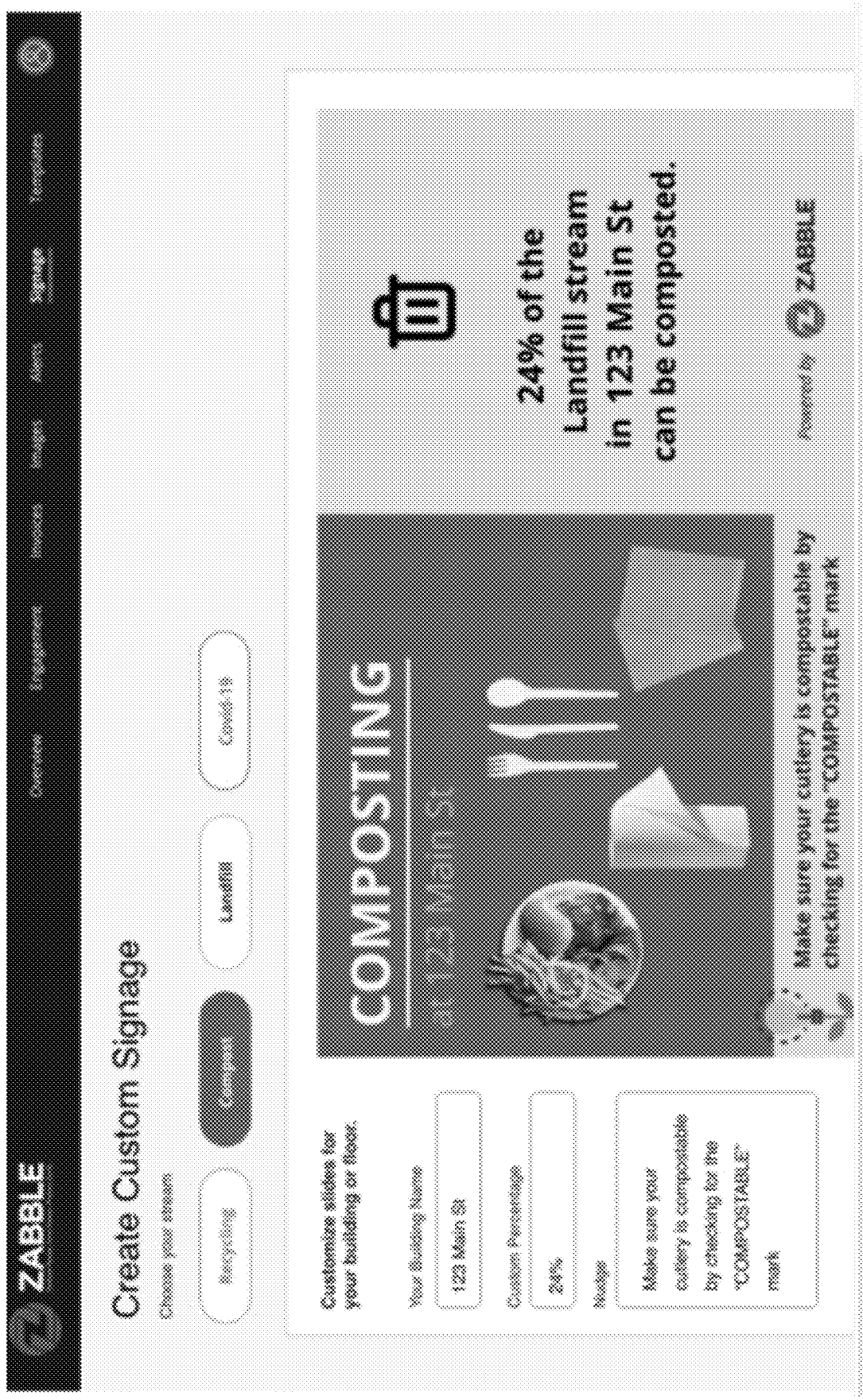
FIG. 29 is a screen image from an exemplary dashboard showing customizable signage with aggregated properties to be displayed via digital or printed media inside or outside a building.

During the project, each user tagged landfill, recycling, and compost bins more than a 1000 times to document their estimated contribution to contamination, thus unlocking granular insights. FIG. 20 presents an example in the form of a reported heat map visualization showing the distribution of waste stream material types by frequency across different floors. These insights were utilized to inform targeted actions to fix problems, decrease contamination and boost diversion rates. For example, it was discovered that much of the contamination from food residue in clamshell food containers could be attributed to a few specific floors. The corporate client saw these insights, determined that the cause was takeout orders, and figured out how to partner with nearby restaurant vendors to replace disposable containers with reusable alternatives.

With reliable analysis and measurement of waste generation at each building, managers were equipped with the insights to optimize collection and sorting times for janitorial staff to come and consolidate waste on each floor or at the loading dock. Previously, with highly contaminated waste streams, it was taking more time (and incurring greater labor costs) to pull out bags and sort them correctly. Thus, when contamination went down, so did waste collection and sorting time and labor costs by 50%.

Furthermore, with the provided reports the corporate client harnessed granular waste data to create curated messaging aimed at behavioral change. These digital messages were easily shared across internal communication media such as digital screens, messaging applications, email and newsletters. For example, the Client found that one building had 30% more food waste sightings than the other two buildings. Equipped with this data, the Client created targeted messaging requesting that employees rinse food containers before disposing them of appropriately in a recycle bin or a compost bin, if the material were accepted by the municipality as compostable. Precise and relevant data created engaging educational content, offering viewers tangible steps to reduce contamination on that floor. Communication occurred through in-person events, internal digital channels and physical media such as signage.

Prior to implementing the methods, systems, and devices disclosed herein, the corporate client was getting fined heavily for contamination in their waste stream, with total program costs doubling from $30,000 to $60,000 due to fines and increased hauler costs, requiring an immediate remedy for the problem. Additionally, the corporate client incurred an extra annual cost of $80,000 to hire sorters. The increase to total yearly costs was over $500,000 annually, including expenses associated with waste pickups, fines, sorting, education and remediation activities. Before the project, generic data from a single audit limited the organization's ability to pinpoint sources and space-level distribution of contamination. Using the provided methods, systems, and devices, the facility and sustainability teams were able to regularly monitor waste generation, diversion, contamination and operational issues, allowing the teams to identify areas for improvement, tackle problems the right away and boost overall process efficiency. The corporate client was able to harness its newfound data towards zero waste campaigns aimed at its biggest problems. For example, one campaign involved hyper-targeted communication through digital means based on prevalence of food waste found on certain floors, while another involved updating all the signage with standardized design.

The staff spent 120 hours overall using the mobile software application to tag contaminants and problem areas, 40 hours on data-driven resources and activities to tackle contamination, and 12 hours in meetings and project management tasks, totaling 172 hours over the course of the 6-month project. Overall, the corporate client saved 40 hours more per month compared to previous methods, due to speeding up data collection and analytics by 33%.

Enhanced waste monitoring and data collection helped the corporate client target contamination hotspots and reduce contamination by 30%, bringing them into compliance and regaining their diversion discount from the hauler, thus saving $15,000/month. Additional annual cost savings of $40,000 were realized as the Client reduced labor to sort contaminated waste streams.

Using the provided devices, systems, and methods, the corporate client established a model for a new paradigm of tracking waste, preventing and rapidly handling disruptive problems, harnessing data to inform targeted actions, and developing a streamlined process to move towards their zero waste goal. The result was a significant cost savings that translated to a return on investment within 6 months. Moreover, the reduction in contamination by 30% contributed to lowering greenhouse gas emissions by 454 metric tons of carbon dioxide equivalent, producing an impact similar to that from removing 100 passenger vehicles from operation for a year.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications, websites, and databases cited herein are hereby incorporated by reference in their entireties for all purposes. Where a conflict exists between the instant application and a reference provided herein, the instant application shall dominate.

What is claimed is:

1. A method of evaluating waste, the method comprising:
   acquiring a plurality of images, wherein each of the plurality of images is independently a representation of at least a portion of the contents of a waste container associated with a waste generator, and wherein the plurality of images comprises representations of at least a portion of the contents of two or more different waste containers;
   identifying, for each of at least a portion of the plurality of images, one or more characteristics of the waste container contents represented by the image; and
   generating, using one or more automated computer systems, a report based on at least a portion of the one or more identified characteristics.

2. The method of claim 1, wherein the plurality of images comprises images acquired at times at least 12 hours apart from one another.

3. The method of claim 2, wherein the images acquired at times at least 12 hours apart from one another comprise images representing at least a portion of the contents of the same waste container.

4. The method of claim 1, wherein each of the plurality of images is acquired at a time within a period less than 1 hour.

5. The method of claim 1, wherein the one or more characteristics comprise one or more characteristics selected from the group consisting of an estimated waste container fullness, a categorization of one or more waste material types present in the waste container contents, and a presence or absence of a contaminant in the waste container contents.

6. The method of claim 1, wherein the identifying comprises analyzing the portion of the plurality of images using the one or more automated computer systems.

7. The method of claim 6, wherein the analyzing comprises applying artificial intelligence and computer vision using the one or more automated computer systems.

8. The method of claim 1, wherein the identifying comprises accepting and recording user input descriptive of the portion of the plurality of images.

9. The method of claim 1, wherein the generating of the report comprises deriving estimated aggregated properties for the waste containers of the waste generator.

10. The method of claim 1, wherein the report comprises characteristics of an individual waste container of the waste generator.

11. The method of claim 1, wherein the generating of the report comprises formulating a recommendation for one or more improvements to future waste management practices by the waste generator.

12. The method of claim 11, wherein the one or more improvements comprise one or more improvements selected from the group consisting of reduced waste volume, reduced waste mass, reduced waste contamination, and increased landfill recovery.

13. The method of claim 1, further comprising:
   communicating, using the one or more automated computer systems, the generated report.

14. The method of claim 1, wherein the waste containers of the waste generator comprise one or more waste container types selected from the group consisting of waste bins, waste bags, waste carts, dumpsters, and compactors.

15. The method of claim 1, wherein the plurality of images are acquired using one or more imaging modalities selected from the group consisting of visible light, infrared light, ultrasound, and X-ray.

16. The method of claim 1, wherein the waste containers associated with the waste generator are located in a site selected from the group consisting of a hospital, a research facility, and an industrial production facility, and wherein the waste container contents comprise one or more waste material types selected from the group consisting of hazardous chemical waste, sharps waste, biohazard waste, and radiological waste.

17. The method of claim 1, wherein the waste containers associated with the waste generator are located in a site selected from the group consisting of an office space, a retail space, or an academic space, and wherein the waste container contents comprise one or more waste material types selected from the group consisting of paper waste, plastic waste, and food waste.

18. A machine-readable non-transitory medium embodying information indicative of instructions for causing one or more machines to perform operations for evaluating waste, the operations including:
   acquiring a plurality of images, wherein each of the plurality of images is independently a representation of at least a portion of the contents of a waste container associated with a waste generator, and wherein the plurality of images comprises representations of at least a portion of the contents of two or more different waste containers;
   identifying, for each of at least a portion of the plurality of images, one or more characteristics of the waste container contents represented by the image; and
   generating a report based on at least a portion of the one or more identified characteristics.

19. A computer system for evaluating waste, the computer system comprising:
   at least one processor, and
   a memory operatively coupled with the at least one processor, the at least one processor executing instructions from the memory comprising:
      program code for acquiring a plurality of images, wherein each of the plurality of images is independently a representation of at least a portion of the contents of a waste container associated with a waste generator, and wherein the plurality of images comprises representations of at least a portion of the contents of two or more different waste containers;
      program code for identifying, for each of at least a portion of the plurality of images, one or more characteristics of the waste container contents represented by the image; and
      program code for generating a report based on at least a portion of the one or more identified characteristics.

* * * * *